US 12,435,635 B2

(12) United States Patent
Cavadini

(10) Patent No.: US 12,435,635 B2
(45) Date of Patent: Oct. 7, 2025

(54) TURBINE COMPONENT FOR GAS TURBINE ENGINE

(71) Applicant: Siemens Energy Global GmbH & Co. KG, Munich (DE)

(72) Inventor: Philipp Cavadini, Berlin (DE)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 0 days.

(21) Appl. No.: 18/813,053

(22) Filed: Aug. 23, 2024

(65) Prior Publication Data
US 2025/0075624 A1 Mar. 6, 2025

(30) Foreign Application Priority Data
Sep. 6, 2023 (GB) .................... 2313562

(51) Int. Cl.
F01D 5/18 (2006.01)
F01D 5/14 (2006.01)
F01D 9/04 (2006.01)

(52) U.S. Cl.
CPC ............ F01D 5/18 (2013.01); F05D 2230/50 (2013.01); F05D 2260/20 (2013.01)

(58) Field of Classification Search
CPC .......... F01D 5/187; F01D 9/041; F01D 5/188; F01D 5/186; F01D 5/189; F01D 9/065; F01D 5/18; F01D 5/147; F01D 25/12; F01D 9/02; F05D 2240/81; F05D 2260/20; F05D 2260/201; F05D 2260/22141; F05D 2250/185; F05D 2260/205; F05D 2240/12; F05D 2240/125; F05D 2240/303; F05D 2240/305; F05D 2260/202; F05D 2260/204; F05D 2260/221; F05D 2210/40; F05D 2240/10; F05D 2240/122; F05D 2240/304; F05D 2240/307; F05D 2240/306; F05D 2250/323; F05D 2250/512; F05D 2250/70; F05D 2260/2214; F05D 2230/50; F05B 2240/801; F05B 2240/12

See application file for complete search history.

(56) References Cited

U.S. PATENT DOCUMENTS

| 3,807,892 A * | 4/1974 | Frei .................. F01D 5/187 415/178 |
| 4,946,346 A * | 8/1990 | Ito .................. F01D 5/189 415/115 |
| 5,498,126 A | 3/1996 | Pighetti et al. |
| 5,634,766 A * | 6/1997 | Cunha .................. F01D 5/187 415/209.2 |

(Continued)

Primary Examiner — Eric J Zamora Alvarez

(57) ABSTRACT

A turbine component includes an airfoil extending between an inner platform and an outer platform, a leading edge rib positioned in a leading edge region of the airfoil and having a plurality of leading edge rib openings, each leading edge rib opening positioned nearer to one of a pressure side wall and a suction side wall of the airfoil than the other of the pressure side wall and the suction side wall, a rear rib positioned in a trailing edge region of the airfoil, a first cooling path extending from a flow inlet formed in one of the inner platform and the outer platform, through the leading edge region, through an inner platform cooling passage, and into the trailing edge region, and a second cooling path extending from the flow inlet, through a middle region of the airfoil, and into the trailing edge region.

20 Claims, 20 Drawing Sheets

(56) References Cited

U.S. PATENT DOCUMENTS

| | | | | |
|---|---|---|---|---|
| 5,772,398 | A | * | 6/1998 | Noiret ............... F01D 5/189 |
| | | | | 415/115 |
| 5,997,245 | A | * | 12/1999 | Tomita ............... F01D 5/187 |
| | | | | 415/115 |
| 6,200,087 | B1 | * | 3/2001 | Tung ................. F01D 5/186 |
| | | | | 415/115 |
| 6,398,486 | B1 | * | 6/2002 | Storey ............... F01D 5/188 |
| | | | | 415/114 |
| 7,785,072 | B1 | * | 8/2010 | Liang ................ F01D 9/041 |
| | | | | 416/97 R |
| 8,011,881 | B1 | * | 9/2011 | Liang ................ F01D 5/187 |
| | | | | 415/115 |
| 8,757,974 | B2 | * | 6/2014 | Propheter-Hinckley ............... |
| | | | | F01D 5/188 |
| | | | | 416/97 R |
| 8,827,632 | B1 | * | 9/2014 | Lee .................. F01D 5/188 |
| | | | | 415/115 |
| 9,631,499 | B2 | * | 4/2017 | Liang ................ F01D 9/041 |
| 2006/0140762 | A1 | | 6/2006 | Pietraszkiewicz et al. |
| 2009/0074575 | A1 | | 3/2009 | Propheter-Hinckley et al. |

\* cited by examiner

TURBINE COMPONENT FOR GAS TURBINE ENGINE

BACKGROUND

A gas turbine engine typically includes a compressor section, a turbine section, and a combustion section disposed therebetween. The compressor section includes multiple stages of rotating compressor blades and stationary compressor vanes. The combustion section typically includes a plurality of combustors. The turbine section includes multiple stages of rotating turbine blades and stationary turbine vanes. The rotating turbine blades and stationary turbine vanes often operate in a high temperature environment and need to be cooled.

BRIEF SUMMARY

In one aspect, a turbine component is provided. The turbine component includes an inner platform having an inner platform cooling passage, an outer platform, an airfoil extending between the inner platform and the outer platform, the airfoil having a pressure side wall, a suction side wall, a leading edge, a trailing edge, a leading edge region, a trailing edge region, and a middle region defined between the leading edge region and the trailing edge region, a leading edge rib positioned in the leading edge region and between the pressure side wall and the suction side wall, a plurality of leading edge rib openings formed in the leading edge rib, each leading edge rib opening positioned nearer to one of the pressure side wall and the suction side wall than the other of the pressure side wall and the suction side wall, a rear rib positioned in the trailing edge region and between the pressure side wall and the suction side wall, a first cooling path extending from a flow inlet formed in one of the inner platform and the outer platform, through the leading edge region, through the inner platform cooling passage, and into the trailing edge region, and a second cooling path extending from the flow inlet, through the middle region, and into the trailing edge region.

In one aspect, a method for forming a turbine component is provided. The method includes forming an airfoil having a pressure side wall, a suction side wall, a leading edge, and a trailing edge, a leading edge region, a trailing edge region, and a middle region defined between the leading edge region and the trailing edge region, positioning a leading edge rib in the leading edge region and between the pressure side wall and the suction side wall, forming a plurality of leading edge rib openings in the leading edge rib, each leading edge rib opening positioned nearer to one of the pressure side wall and the suction side wall than the other of the pressure side wall and the suction side wall, positioning a rear rib in the trailing edge region and between the pressure side wall and the suction side wall, forming a flow inlet in one of an inner platform and an outer platform, creating a first cooling path extending from the flow inlet, through the leading edge region, through an inner platform cooling passage, and into the trailing edge region, and establishing a second cooling path extending from the flow inlet, through the middle region, and into the trailing edge region.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
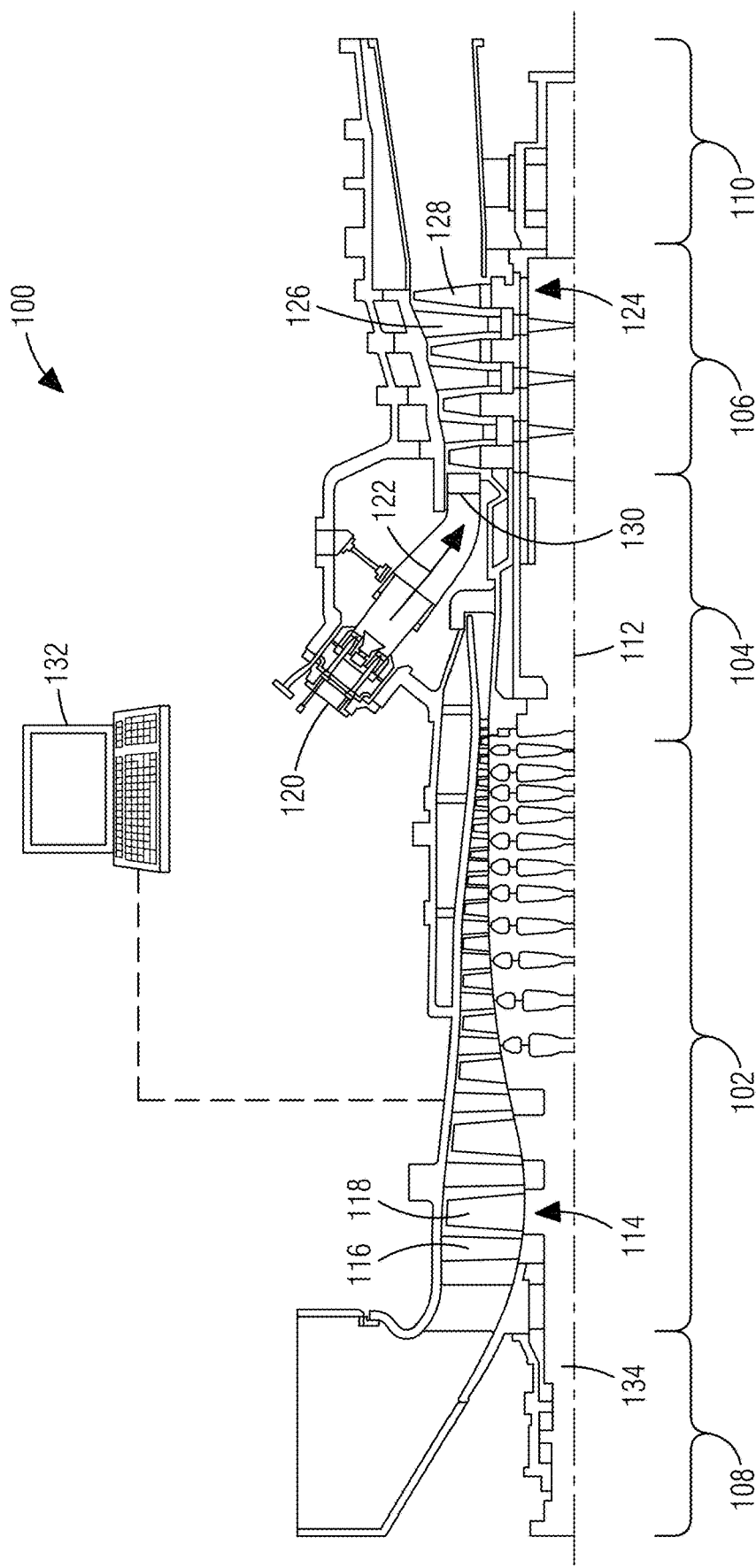
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms "including", "having", and "comprising", as well as derivatives thereof, mean inclusion without limitation. The singular forms "a", "an", and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In the description, the terms "axial" or "axially" refer to a direction along a longitudinal axis of a gas turbine engine. The terms "radial" or "radially" refer to a direction perpendicular to the longitudinal axis of the gas turbine engine. The terms "downstream" or "aft" refer to a direction along a flow direction. The terms "upstream" or "forward" refer to a direction against the flow direction.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of stationary compressor vanes 116 or adjustable guide vanes and a set of rotating compressor blades 118. A rotor 134 supports the rotating compressor blades 118 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operates to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of stationary turbine vanes 126 and a number of rotating turbine blades 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other devices to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions, the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output setpoint and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature, and pressure, combustor outlet temperature, fuel flow rate, generator power output, bearing temperature, and the like. Many of these measurements are displayed for the user and are logged for later review should such a review be necessary.

Figure 2:
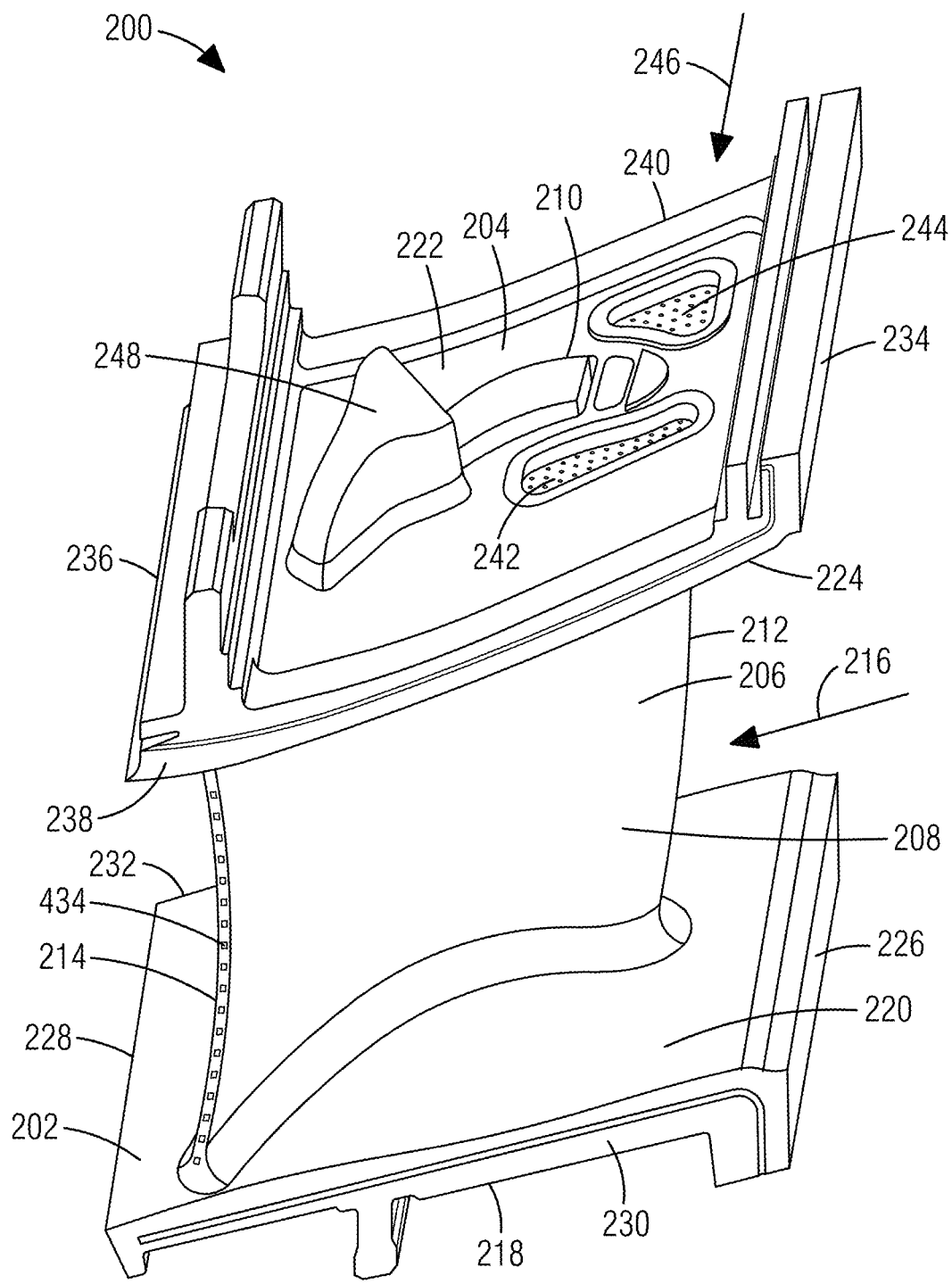
FIG. 2 is a perspective view of a turbine component suitable for use in the gas turbine engine of FIG. 1.

FIG. 2 is a perspective view of a turbine component 200 and specifically a stationary turbine vane 126 as shown in FIG. 1. While the turbine component 200 in FIG. 2 illustrates the stationary turbine vane 126, in other constructions, the turbine component 200 can be the rotating turbine blade 128 in FIG. 1.

The turbine component 200 includes platforms such as an inner platform 202 and an outer platform 204. The turbine component 200 includes an airfoil 206 that is disposed between the inner platform 202 and the outer platform 204. The airfoil 206 has a pressure side wall 208 and a suction side wall 210 joining at a leading edge 212 at an upstream side and a trailing edge 214 at a downstream side with respect to a flow direction of a working flow 216. The working flow 216 includes the exhaust gas 122 of FIG. 1. The pressure side wall 208 has a generally concave shape. The suction side wall 210 has a generally convex shape. The pressure side wall 208 and the suction side wall 210 define an internal cooling space therebetween.

Each platform has a cold side and a hot side. The hot side is arranged such that it forms part of a hot gas path that is in direct contact with products of combustion. The products of combustion include the working flow 216. The cold side is opposite the hot side and is not exposed to direct contact with this hot gas. As shown in FIG. 2, the inner platform 202 has an inner platform cold side 218 and an inner platform hot side 220. The outer platform 204 has an outer platform cold side 222 and an outer platform hot side 224. The airfoil 206 is attached to the inner platform hot side 220 and the outer platform hot side 224.

Each platform has an upstream side face and a downstream side face with respect to the flow direction of the working flow 216. The inner platform 202 has an inner platform upstream side face 226 and an inner platform downstream side face 228. The outer platform 204 has an outer platform upstream side face 234 and an outer platform downstream side face 236.

Each platform has a suction side mate face and a pressure side mate face that are each generally adjacent to another turbine component 200 in a circumferential direction around the rotor 134 in FIG. 1. The inner platform 202 has an inner platform suction side mate face 232 and an inner platform pressure side mate face 230. The outer platform 204 has an outer platform pressure side mate face 238 and an outer platform suction side mate face 240.

The outer platform 204 includes a pressure side impingement plate 242 and a suction side impingement plate 244 disposed at the outer platform cold side 222. The pressure side impingement plate 242 is placed adjacent to the pressure side wall 208 and extends from the leading edge 212 toward the trailing edge 214. The suction side impingement plate 244 is placed adjacent to the suction side wall 210 and extends from the leading edge 212 toward the trailing edge 214. The outer platform 204 has a pressure side impingement pocket 302 (shown in FIG. 3) that is covered by the pressure side impingement plate 242 and a suction side impingement pocket 304 (shown in FIG. 3) that is covered by the suction side impingement plate 244. The pressure side impingement plate 242 and the suction side impingement plate 244 define a plurality of impingement cooling holes to provide a cooling flow 246 into the pressure side impingement pocket 302 and the suction side impingement pocket 304. The cooling flow 246 includes the compressed air from the compressor section 102, with other types of cooling flow possible.

A hood 248 is coupled to the outer platform 204. The hood 248 is disposed along the internal cooling space and has an opening that is in fluid communication with the internal cooling space. The hood 248 covers the internal cooling space from the trailing edge 214 toward the leading edge 212. In other constructions, the hood 248 may cover the internal cooling space at any desired section from the leading edge 212 to the trailing edge 214. It is also understood that the hood 248 may be coupled to the inner platform 202 along the internal cooling space and has an opening that is in fluid communication with the internal cooling space.

Figure 3:
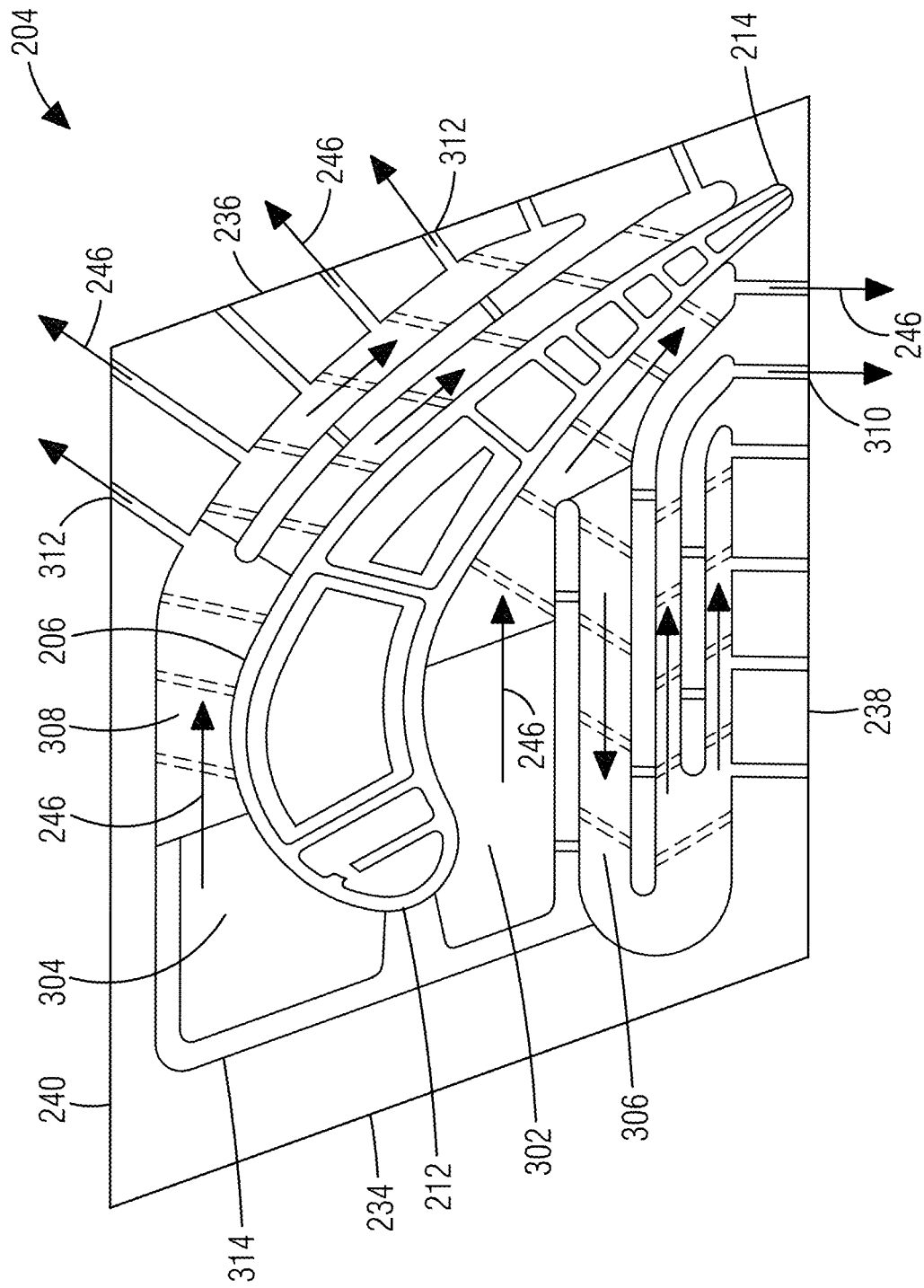
FIG. 3 is a section of an outer platform of the turbine component of FIG. 2.

FIG. 3 is a section view of the outer platform 204. The outer platform 204 includes an outer platform cooling passage 314 having an outer platform pressure side cooling passage 306 and an outer platform suction side cooling passage 308. The outer platform pressure side cooling passage 306 is formed within the pressure side of the outer platform 204 between the outer platform upstream side face 234 and the outer platform downstream side face 236. The pressure side impingement pocket 302 reserves the cooling flow 246 that passes through the impingement cooling holes of the pressure side impingement plate 242. The cooling flow 246 in the pressure side impingement pocket 302 flows through the outer platform pressure side cooling passage 306 and exits the outer platform 204 through a plurality of outer platform pressure side exit holes 310. The plurality of outer platform pressure side exit holes 310 are positioned along the outer platform pressure side mate face 238. The outer platform pressure side cooling passage 306 is a serpentine flow path. As used herein, the term "serpentine flow path" refers to a flow path that includes at least one turn of greater than 45 degrees.

The outer platform suction side cooling passage 308 is formed within the suction side of the outer platform 204 between the outer platform upstream side face 234 and the outer platform downstream side face 236. The suction side impingement pocket 304 reserves the cooling flow 246 that passes through the impingement cooling holes of the suction side impingement plate 244. The cooling flow 246 in the suction side impingement pocket 304 flows through the outer platform suction side cooling passage 308 and exits the outer platform 204 through a plurality of outer platform suction side exit holes 312. The plurality of outer platform suction side exit holes 312 are positioned along the outer platform downstream side face 236 and outer platform suction side mate face 240.

Figure 4:
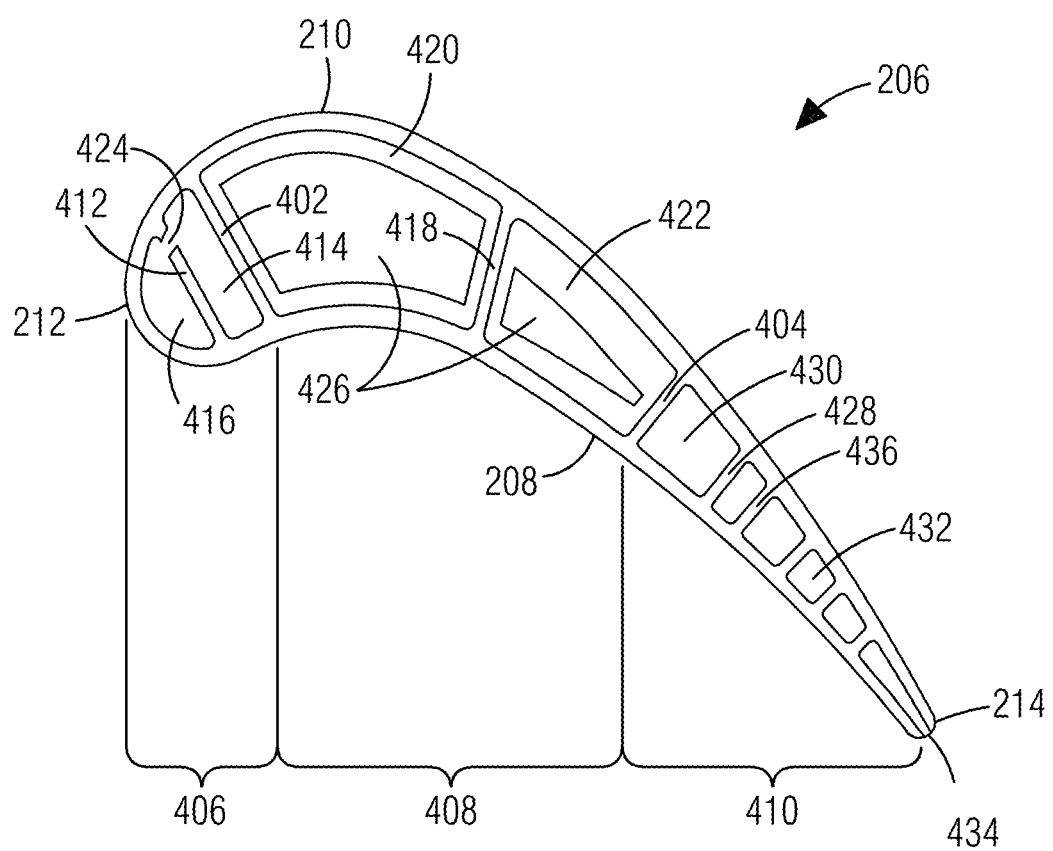
FIG. 4 is a section view of an airfoil of the turbine component of FIG. 2.

FIG. 4 is a section view of the airfoil 206. The airfoil 206 has a front rib 402 and a rear rib 404 that are positioned between the pressure side wall 208 and the suction side wall 210. The airfoil 206 has a leading edge region 406 that is arranged at the leading edge side, a trailing edge region 410 that is arranged at the trailing edge side, and a middle region 408 that is arranged between the leading edge region 406 and the trailing edge region 410. In the embodiment illustrated in FIG. 4, the leading edge region 406 is defined between the leading edge 212 and the front rib 402, The middle region 408 is defined between the front rib 402 and the rear rib 404. The trailing edge region 410 is defined between the rear rib 404 and the trailing edge 214.

A leading edge rib 412 is positioned within the leading edge region 406 between the pressure side wall 208 and the suction side wall 210. The leading edge rib 412 divides the leading edge region 406 into a first leading edge cooling passage 414 and a second leading edge cooling passage 416. The first leading edge cooling passage 414 is defined between the front rib 402 and the leading edge rib 412. The second leading edge cooling passage 416 is defined between the leading edge rib 412 and the leading edge 212. A plurality of leading edge rib openings 424 are formed in the leading edge rib 412 and distributed along the leading edge rib 412 between the inner platform 202 and the outer platform 204. The plurality of leading edge rib openings 424 are positioned nearer to one of the pressure side wall 208 and the suction side wall 210 than the other of the pressure side wall 208 and the suction side wall 210. In the embodiment illustrated in FIG. 4, the plurality of leading edge rib openings 424 are positioned nearer to the suction side wall 210 than the pressure side wall 208. In other constructions, the plurality of leading edge rib openings 424 may be positioned nearer to the pressure side wall 208 than to the suction side wall 210, or a portion of the leading edge rib opening 424 are positioned nearer to the suction side wall 210 than to the pressure side wall 208 and the remaining portion of the leading edge rib opening 424 are positioned nearer to the pressure side wall 208 than to the suction side wall 210. In the embodiment illustrated in FIG. 4, the distribution and size of the leading edge rib openings 424 are equal in the flow direction of the first cooling flow 506. In other embodiments, the distribution and size of the leading edge rib openings 424 may be varied in the flow direction based on design requirements. For example, the size of the leading edge rib openings 424 may be smaller at the beginning of the second leading edge cooling passage 416 and wider towards the end of the second leading edge cooling passage 416.

A middle rib 418 is positioned within the middle region 408 between the pressure side wall 208 and the suction side wall 210. The middle rib 418 divides the middle region 408 into a first middle cooling passage 420 and a second middle cooling passage 422. The first middle cooling passage 420 is defined between the front rib 402 and the middle rib 418. The second middle cooling passage 422 is defined between the middle rib 418 and the rear rib 404. A first displacement body 426 is inserted into the first middle cooling passage 420 to form a first near wall cooling passage between the first displacement body 426 and the pressure side wall 208, the suction side wall 210, the front rib 402, and the middle rib 418. A second displacement body 426 is inserted into the second middle cooling passage 422 to form a second near wall cooling passage between the second displacement body 426 and the pressure side wall 208, the suction side wall 210, the middle rib 418, and the rear rib 404. The first and second displacement bodies 426 may be solid or hollow inside. The first and second displacement bodies 426 are coupled to the pressure side wall 208 and the suction side wall 210 by fastening elements.

A trailing edge rib 428 is positioned within the trailing edge region 410 between the pressure side wall 208 and the suction side wall 210. The trailing edge rib 428 divides the trailing edge region 410 into a first trailing edge cooling passage 430 and a second trailing edge cooling passage 432. The first trailing edge cooling passage 430 is defined between the rear rib 404 and the trailing edge rib 428. The second trailing edge cooling passage 432 is defined between the trailing edge rib 428 and the trailing edge 214. A plurality of pin fins 436 are positioned within the second trailing edge cooling passage 432. A plurality of trailing edge exit holes 434 are formed in the trailing edge 214 and distributed along the trailing edge 214 between the inner platform 202 and the outer platform 204.

Figure 5:
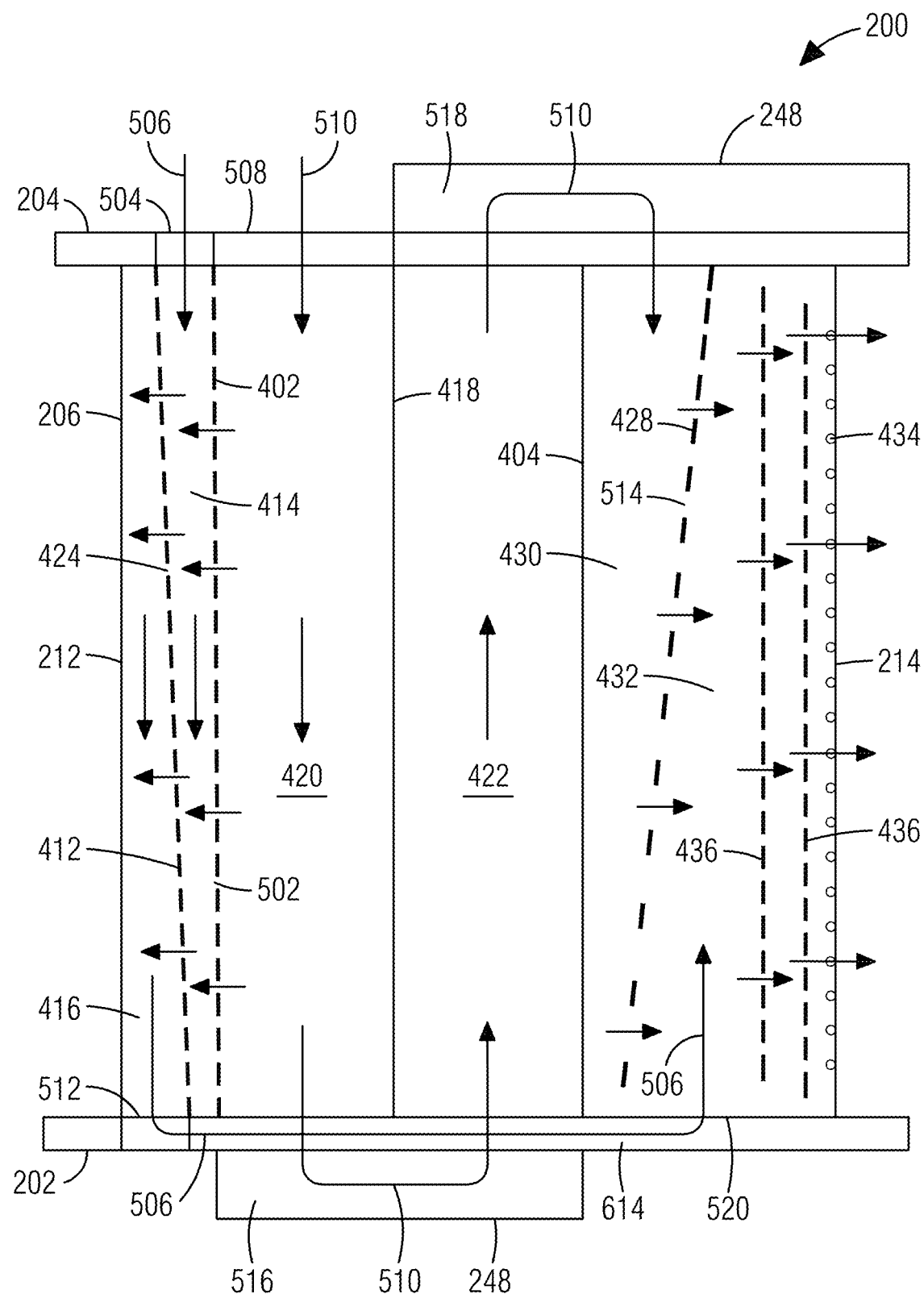
FIG. 5 is a schematic section view of the turbine component of FIG. 2.

FIG. 5 is a schematic section view of the turbine component 200. A plurality of front rib openings 502 are formed in the front rib 402 and distributed along the front rib 402 between the inner platform 202 and the outer platform 204. In other constructions, the front rib 402 may be a solid rib without the front rib openings 502.

A first inlet 504 is formed in one of the inner platform 202 and the outer platform 204 to receive a first cooling flow 506 into the first leading edge cooling passage 414. In the embodiment illustrated in FIG. 5, the first inlet 504 is formed in the outer platform 204. In other embodiments, the first inlet 504 may be formed in the inner platform 202. The first leading edge cooling passage 414 extends between the front rib 402 and the leading edge rib 412 and extends between the outer platform 204 and the inner platform 202. The second leading edge cooling passage 416 extends between the leading edge rib 412 and the leading edge 212 and extends between the outer platform 204 and the inner platform 202. The leading edge rib 412 is positioned within the leading edge region 406 in a way such that the first leading edge cooling passage 414 is a converging flow passage and the second leading edge cooling passage 416 is a diverging flow passage for the first cooling flow 506. A leading edge flow connection 512 is formed between the leading edge region 406 and the inner platform 202 to direct the first cooling flow 506 from the leading edge region 406 into an inner platform cooling passage 614 formed in the inner platform 202. The leading edge flow connection 512 is the only flow outlet of the leading edge region 406. The first cooling flow 506 may be the cooling flow 246 which includes the compressed air from the compressor section 102, with other types of cooling flow possible.

A second inlet 508 is formed in the one of the inner platform 202 and the outer platform 204 to receive a second cooling flow 510 into the first middle cooling passage 420. In the embodiment illustrated in FIG. 5, the second inlet 508 is formed in the outer platform 204. In other embodiments, the second inlet 508 may be formed in the inner platform 202. The first middle cooling passage 420 extends between the front rib 402 and the middle rib 418 and extends between the outer platform 204 and the inner platform 202. The second middle cooling passage 422 extends between the middle rib 418 and the rear rib 404 and extends between the inner platform 202 and the outer platform 204. The second cooling flow 510 may be the cooling flow 246 which includes the compressed air from the compressor section 102, with other types of cooling flow possible.

A first hood 248 is coupled to the inner platform 202 at the inner platform cold side 218. A first connecting flow passage 516 is formed in the inner platform 202 within the first hood 248. The first connecting flow passage 516 connects the first middle cooling passage 420 with the second middle cooling passage 422 and reverses a flow direction of the second cooling flow 510. A second hood 248 is coupled to the outer platform 204 at the outer platform cold side 222. A second connecting flow passage 518 is formed in the outer platform 204 within the second hood 248. The second connecting flow passage 518 connects the second middle cooling passage 422 with the trailing edge region 410 and reverses the flow direction of the second cooling flow 510. In other constructions, only one of the inner platform 202 and the outer platform 204 is coupled with a hood 248. In such embodiments, one of the first connecting flow passage 516 and the second connecting flow passage 518 is formed out of the airfoil 206 and the other first connecting flow passage 516 and second connecting flow passage 518 is formed within the airfoil 206. It is also possible that both the inner platform 202 and the outer platform 204 are not coupled with a hood 248. In such embodiments, both the first connecting flow passage 516 and the second connecting flow passage 518 are formed within the airfoil 206.

The first trailing edge cooling passage 430 extends between the rear rib 404 and the trailing edge rib 428 and extends between the outer platform 204 and the inner platform 202. The second trailing edge cooling passage 432 extends between the trailing edge rib 428 and the trailing edge 214 and extends between the inner platform 202 and the outer platform 204. The trailing edge rib 428 is positioned within the trailing edge region 410 in a way such that the first trailing edge cooling passage 430 is a converging flow passage for the second cooling flow 510 and the second trailing edge cooling passage 432 is a converging flow passage for the first cooling flow 506. A trailing edge flow connection 520 is formed between the inner platform cooling passage 614 and the trailing edge region 410 to direct the first cooling flow 506 from the inner platform cooling passage 614 into the trailing edge region 410. In the embodiment illustrated in FIG. 5, the trailing edge flow connection 520 is positioned between the trailing edge rib 428 and the trailing edge 214 to direct the first cooling flow 506 into the second trailing edge cooling passage 432. In other constructions, the trailing edge flow connection 520 may be positioned between the rear rib 404 and the trailing edge rib 428, or any locations desired.

A plurality of trailing edge rib openings 514 are formed in the trailing edge rib 428 and distributed along the trailing edge rib 428 between the inner platform 202 and the outer platform 204. Each trailing edge rib opening 514 defines a size which increases in a flow direction of the first trailing edge cooling passage 430.

The plurality of pin fins 436 are positioned in the second trailing edge cooling passage 432. The plurality of pin fins 436 are arranged in an array including rows between the inner platform 202 and the outer platform 204 and columns between the trailing edge rib 428 and the trailing edge 214. The first cooling flow 506 and the second cooling flow 510 pass around the pin fins 436 and exit the turbine component 200 through the plurality of trailing edge exit holes 434.

Figure 6:
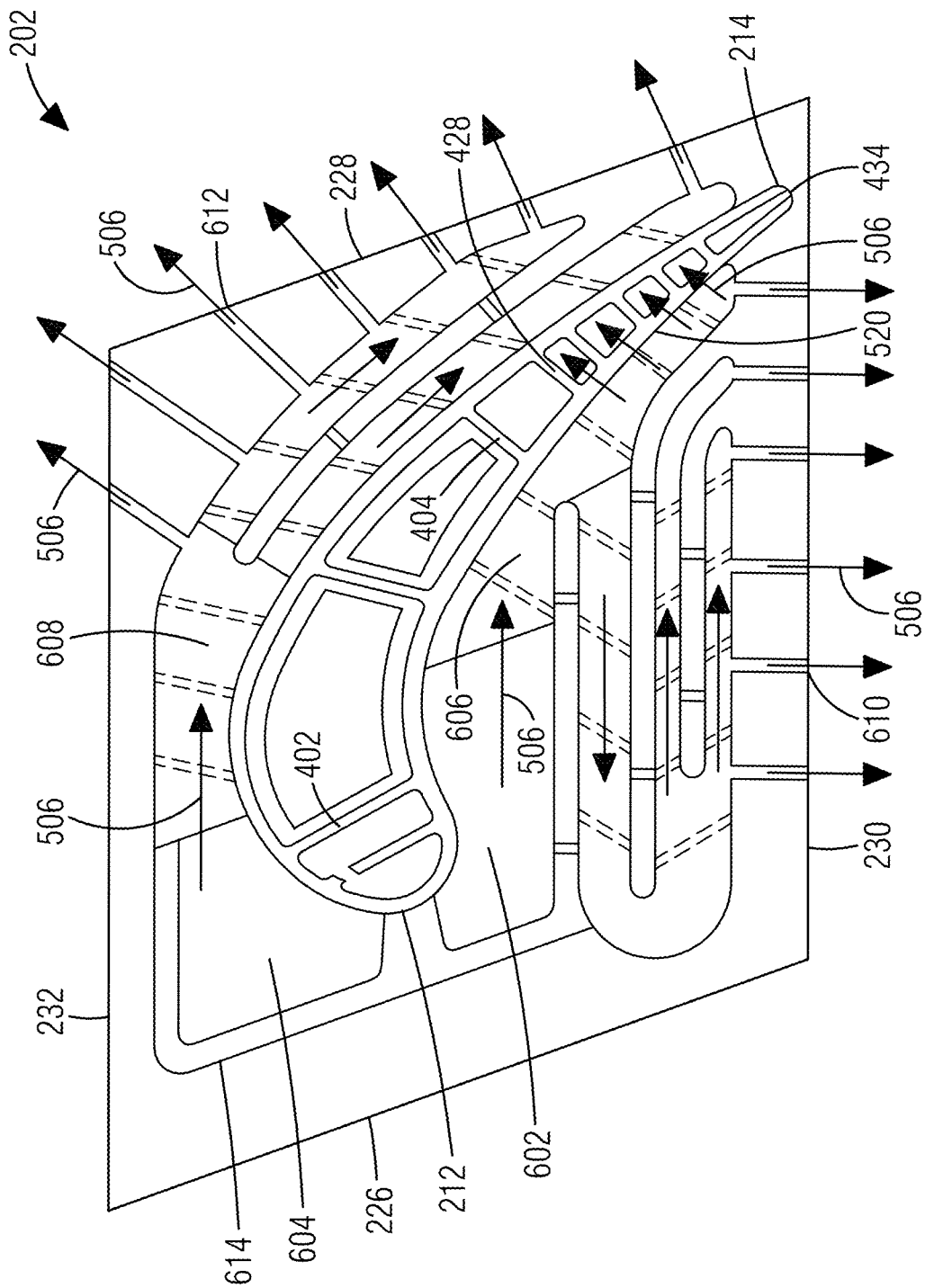
FIG. 6 is a section view of an inner platform of the turbine component of FIG. 2.

FIG. 6 is a section view of the inner platform 202. The inner platform 202 includes a pressure side pocket 602 arranged along the pressure side wall 208 at an upstream side. The inner platform 202 includes a suction side pocket 604 arranged along the suction side wall 210 at the upstream side.

The inner platform 202 includes the inner platform cooling passage 614 having an inner platform pressure side cooling passage 606 and an inner platform suction side cooling passage 608. The inner platform pressure side cooling passage 606 is formed within the pressure side of the inner platform 202 between the inner platform upstream side face 226 and the inner platform downstream side face 228. The pressure side pocket 602 receives a first portion of the first cooling flow 506 from the leading edge region 406. The first portion of the first cooling flow 506 then flows into the inner platform pressure side cooling passage 606. A portion of the first portion of the first cooling flow 506 enters the trailing edge region 410 via the trailing edge flow connection 520. The trailing edge flow connection 520 is positioned between the inner platform pressure side cooling passage 606 and the trailing edge region 410. In other constructions, the trailing edge flow connection 520 may be positioned between the inner platform suction side cooling passage 608 and the trailing edge region 410 or between the inner platform pressure side cooling passage 606 and the trailing edge region 410 and between the inner platform suction side cooling passage 608 and the trailing edge region 410. The remaining portion of the first portion of the first cooling flow 506 flows through a serpentine flow path and exits the turbine component 200 through a plurality of inner platform pressure side exit holes 610 that are positioned along the inner platform pressure side mate face 230. In other constructions, the entire first portion of the first cooling flow 506 may enter the trailing edge region 410 through the trailing edge flow connection 520 or further trailing edge flow connections. The trailing edge flow connection 520 may be formed by machining, or any suitable methods.

The inner platform suction side cooling passage 608 is formed within the suction side of the inner platform 202 between the inner platform upstream side face 226 and the inner platform downstream side face 228. The suction side pocket 604 receives a second portion of the first cooling flow 506 from the leading edge region 406. The second portion of the first cooling flow 506 then flows into the inner platform suction side cooling passage 608 and exits the inner platform 202 through a plurality of inner platform suction side exit holes 612 that are positioned along the inner platform downstream side face 228 and the inner platform suction side mate face 232. In other constructions, at least a portion of the second portion of the first cooling flow 506 may enter into the trailing edge region 410 through further trailing edge flow connections.

Figure 7:
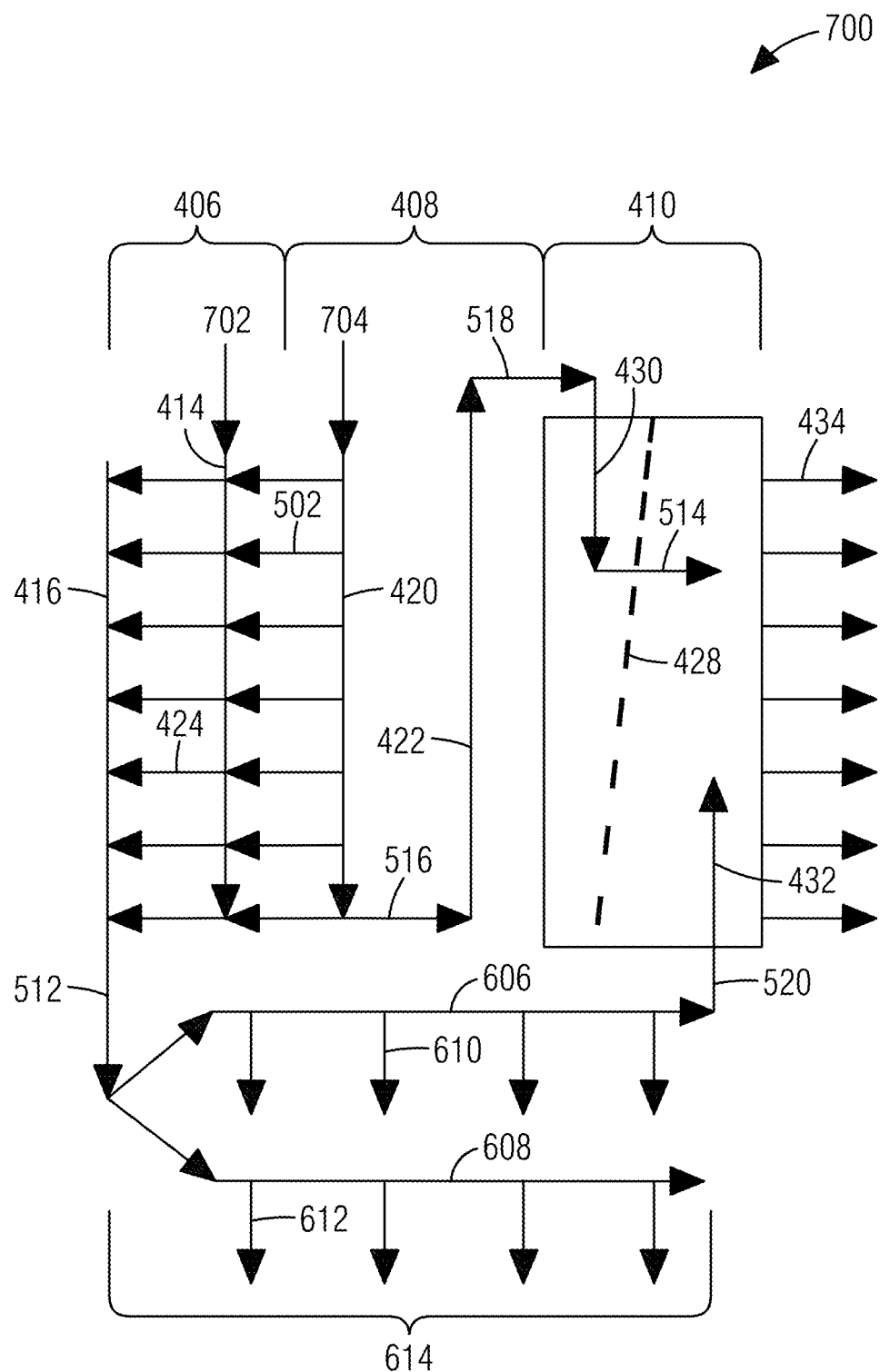
FIG. 7 is a schematic diagram of a cooling scheme of the turbine component of FIG. 2

FIG. 7 is a schematic diagram of a cooling scheme 700 of the turbine component 200. The cooling scheme 700 includes a first cooling path 702 that extends from the first inlet 504, through the leading edge region 406, through the inner platform cooling passage 614, and into the trailing edge region 410. The first cooling flow 506 enters the first cooling path 702 from the first inlet 504 and flows into the first leading edge cooling passage 414. The first cooling flow 506 then flows into the second leading edge cooling passage 416 through the plurality of leading edge rib openings 424 while passing the first leading edge cooling passage 414. The entire first cooling flow 506 then enters the inner platform cooling passage 614 through the leading edge flow connection 512. The leading edge flow connection 512 is the only flow outlet of the first cooling flow 506 in the leading edge region 406. The first portion of the first cooling flow 506 enters the inner platform pressure side cooling passage 606 to cool the inner platform 202 and then flows into the second trailing edge cooling passage 432 through the trailing edge flow connection 520 while a portion of the first portion of the first cooling flow 506 exits the turbine component 200 through the plurality of inner platform pressure side exit holes 610. The second portion of the first cooling flow 506 enters the inner platform suction side cooling passage 608 to cool the inner platform 202 and then exits the turbine component 200 through the plurality of inner platform suction side exit holes 612.

The cooling scheme 700 includes a second cooling path 704 that extends from the second inlet 508, through the middle region 408, and into the trailing edge region 410. The second cooling flow 510 enters the second cooling path 704 from the second inlet 508 and flows into the first middle cooling passage 420. The second cooling flow 510 then flows through the serpentine cooling path formed by the first middle cooling passage 420, the first connecting flow passage 516, the second middle cooling passage 422, the second connecting flow passage 518, and the first trailing edge cooling passage 430. The flow direction of the second cooling flow 510 is reversed by the first connecting flow passage 516 and reversed again by the second connecting flow passage 518. A portion of the second cooling flow 510 enters the first leading edge cooling passage 414 through the plurality of front rib openings 502 and joins the first cooling flow 506 in the first cooling path 702. In other constructions, the front rib 402 may be a solid rib without the front rib openings 502 such that the entire second cooling flow 510 flows through the second cooling path 704.

The second cooling flow 510 in the first trailing edge cooling passage 430 flows into the second trailing edge cooling passage 432 through the plurality of trailing edge rib openings 514 and mixes with the first cooling flow 506 in the second trailing edge cooling passage 432. The first cooling flow 506 and the second cooling flow 510 flow around the plurality of pin fins 436 (shown in FIG. 5) and exit the turbine component 200 through the plurality of trailing edge exit holes 434.

Figure 8:
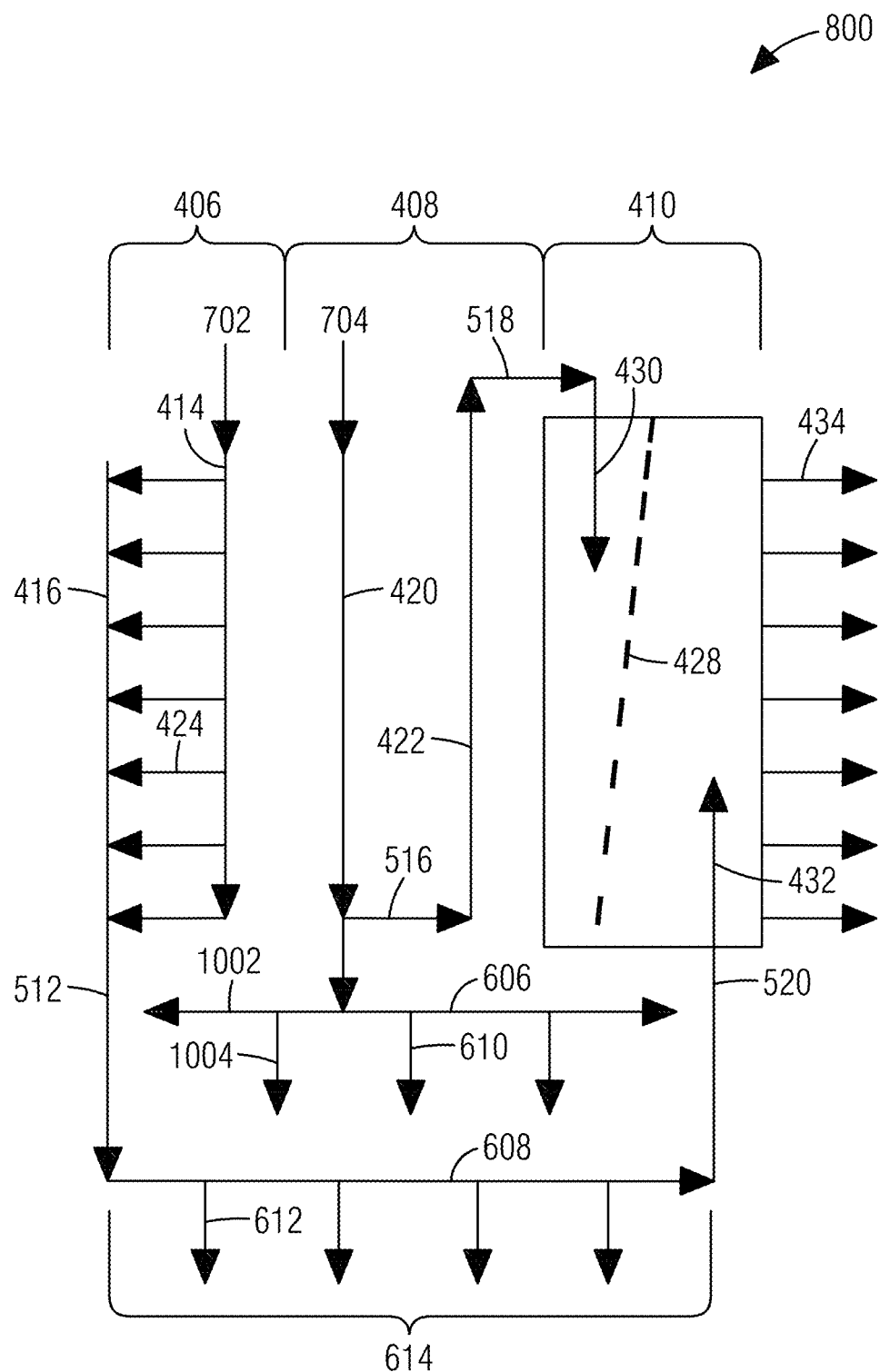
FIG. 8 is a schematic diagram of a cooling scheme.
Figure 9:
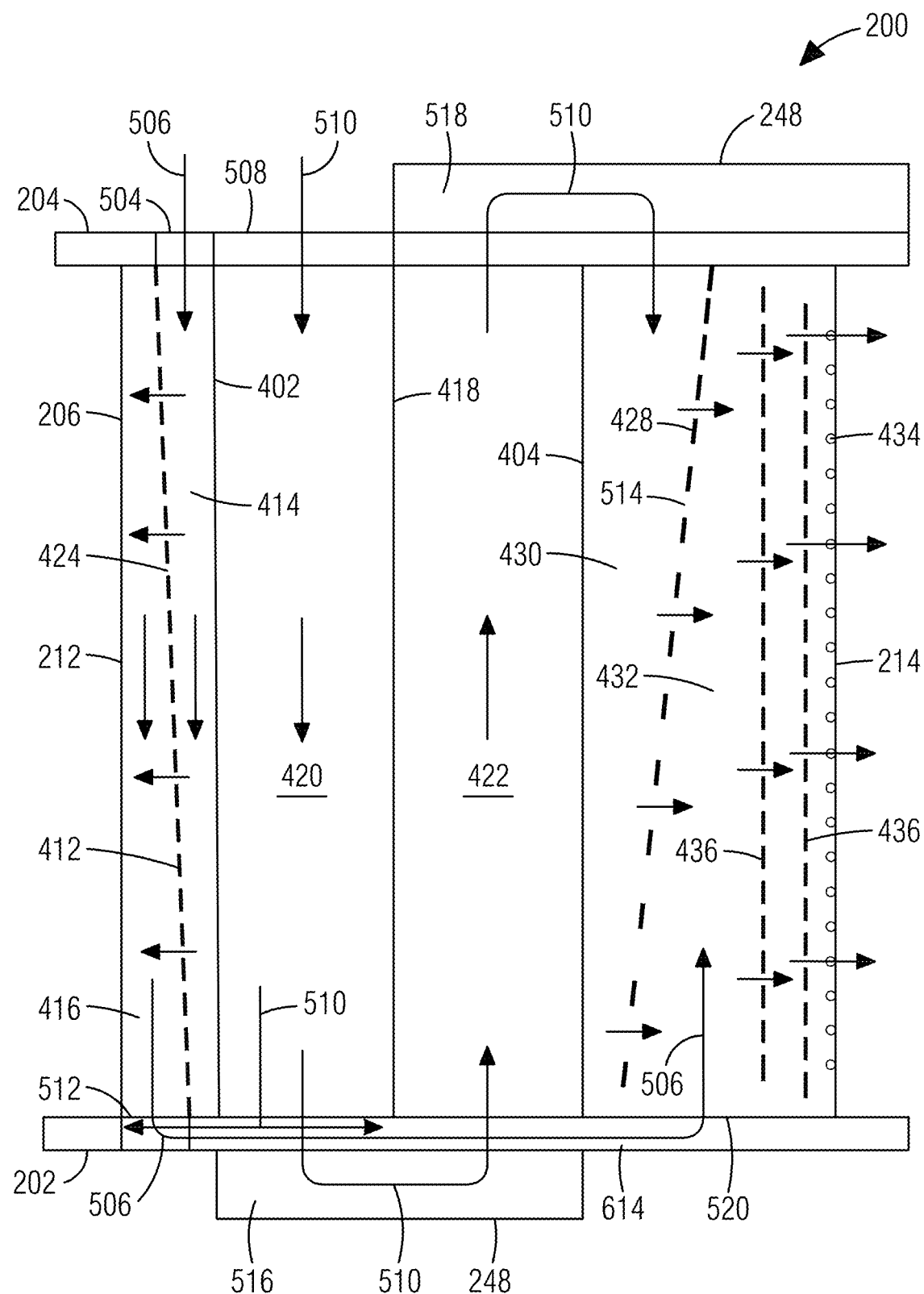
FIG. 9 is a schematic section view of the turbine component of FIG. 2 having the cooling scheme of FIG. 8.
Figure 10:
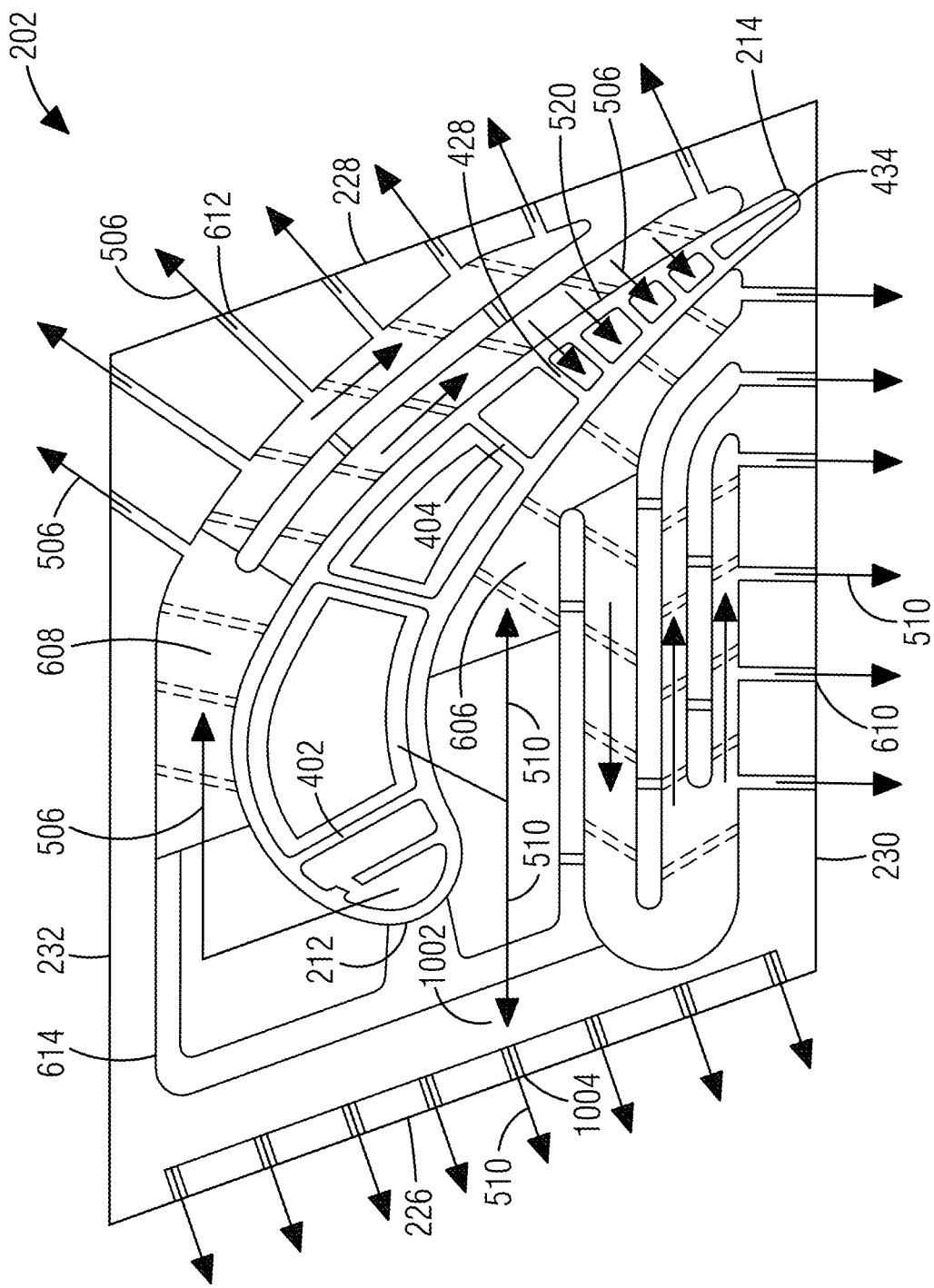
FIG. 10 is a section view of the inner platform of the turbine component of FIG. 2 having the cooling scheme of FIG. 8.

FIG. 8 is a schematic diagram of a cooling scheme 800. FIG. 9 is a schematic section view of the turbine component 200 having the cooling scheme 800. FIG. 10 is a section view of the inner platform 202 having the cooling scheme 800.

In the cooling scheme 800, the trailing edge flow connection 520 is positioned between the inner platform suction side cooling passage 608 and the trailing edge region 410. The entire first cooling flow 506 in the first cooling path 702 enters the inner platform suction side cooling passage 608 to cool the inner platform 202. The entire first cooling flow 506 then flows into the second trailing edge cooling passage 432 through the trailing edge flow connection 520 while a portion of the entire first cooling flow 506 exits the turbine component 200 through the plurality of inner platform suction side exit holes 612.

The second cooling flow 510 in the second cooling path 704 splits into a first portion and a second portion. The first portion of the second cooling flow 510 flows through the serpentine cooling path formed by the first middle cooling passage 420, the first connecting flow passage 516, the second middle cooling passage 422, the second connecting flow passage 518, and the first trailing edge cooling passage 430. A portion of the second portion of the second cooling flow 510 enters the inner platform pressure side cooling passage 606 from the first middle cooling passage 420 to cool the inner platform 202 and then exits the turbine component 200 through the plurality of inner platform pressure side exit holes 610. The inner platform cooling passage 614 includes an inner platform leading edge cooling passage 1002 that is formed between the inner platform upstream side face 226 and the leading edge region 406. The remaining portion of the second portion of the second cooling flow 510 enters the inner platform leading edge cooling passage 1002 to cool the inner platform 202 and then exits the turbine component 200 through a plurality of inner platform leading edge exit holes 1004 that are positioned along the inner platform upstream side face 226.

The front rib 402 is a solid rib without the front rib openings 502. The entire second cooling flow 510 flows through the second cooling path 704. In other constructions, the front rib 402 may have a plurality of front rib openings 502 and a portion of the second cooling flow 510 enters the first leading edge cooling passage 414 through the plurality of front rib openings 502 and joins the first cooling flow 506 in the first cooling path 702, as illustrated in FIG. 5 and FIG. 7.

The cooling scheme 800 otherwise has the similar configuration as the cooling scheme 700.

Figure 11:
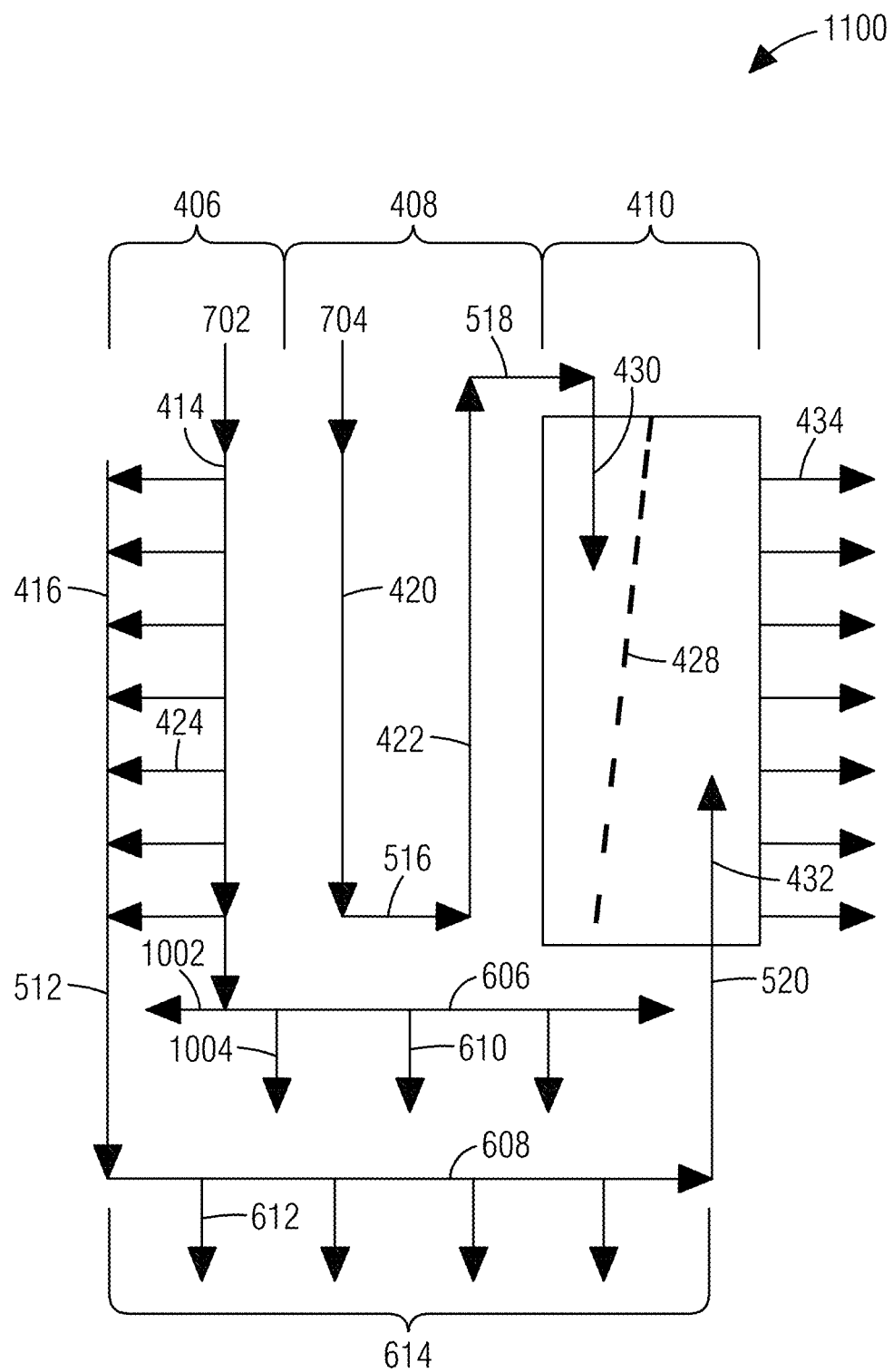
FIG. 11 is a schematic diagram of a cooling scheme.
Figure 12:
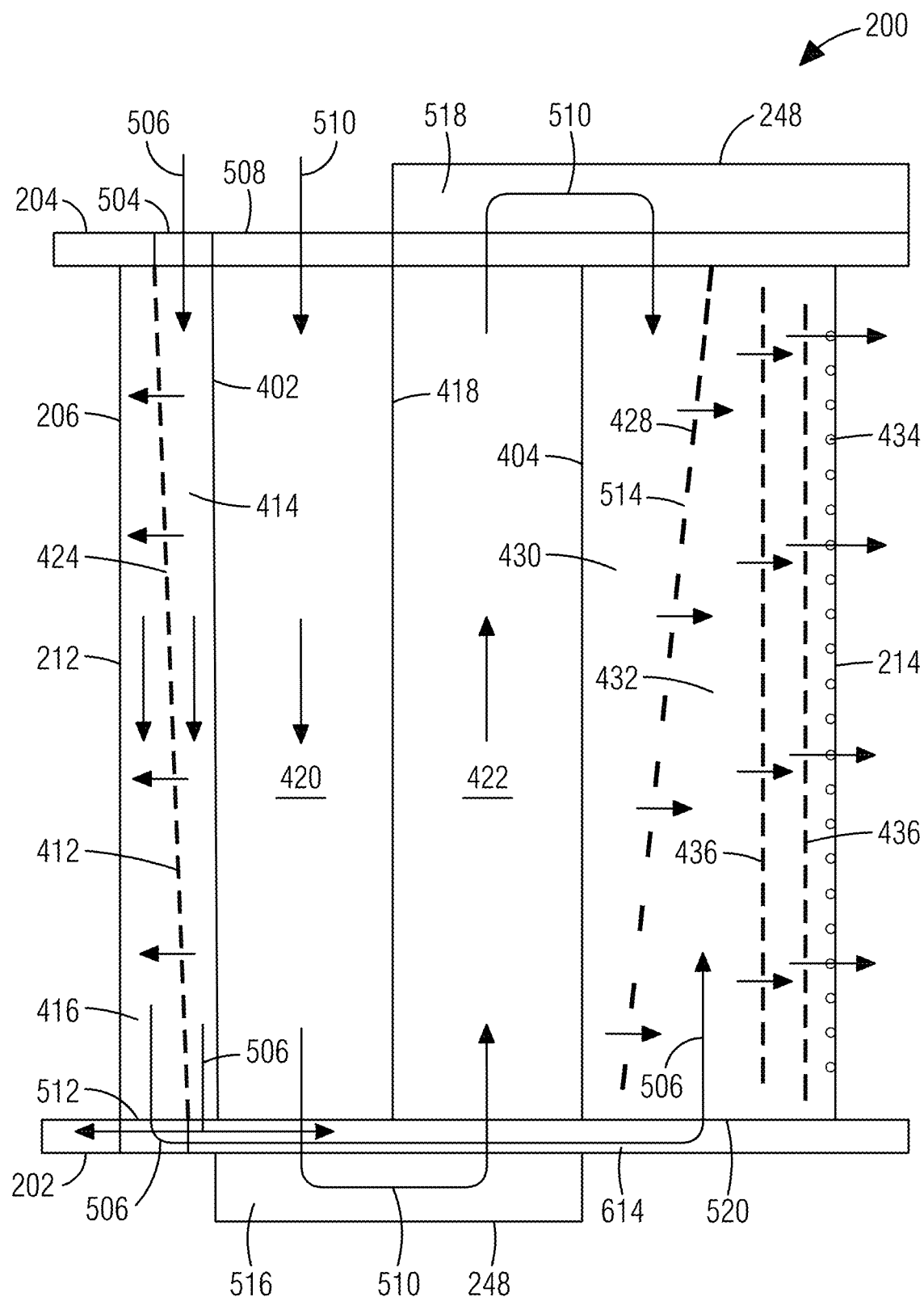
FIG. 12 is a schematic section view of the turbine component of FIG. 2 having the cooling scheme of FIG. 11.
Figure 13:
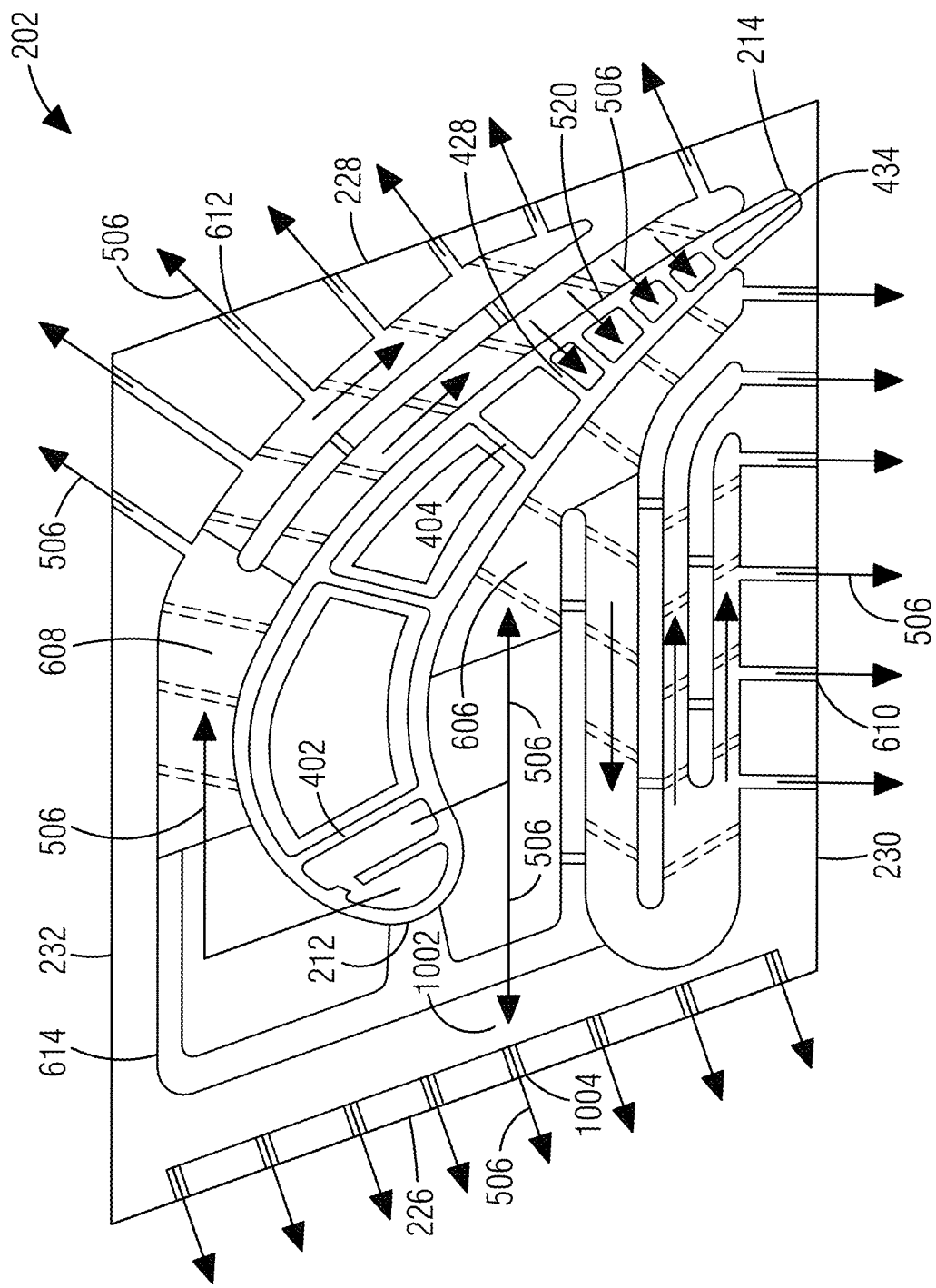
FIG. 13 is a section view of the inner platform of the turbine component of FIG. 2 having the cooling scheme of FIG. 11.

FIG. 11 is a schematic diagram of a cooling scheme 1100. FIG. 12 is a schematic section view of the turbine component 200 having the cooling scheme 1100. FIG. 13 is a section view of the inner platform 202 having the cooling scheme 1100.

In the cooling scheme 1100, the first cooling flow 506 in the first cooling path 702 splits into a first portion and a second portion. The first portion of the first cooling flow 506 flows from the first leading edge cooling passage 414 into the second leading edge cooling passage 416 and then enters the inner platform suction side cooling passage 608. The first portion of the first cooling flow 506 then flows into the second trailing edge cooling passage 432 while a portion of the first portion of the first cooling flow 506 exits the turbine component 200 through the plurality of inner platform suction side exit holes 612. The second portion of the first cooling flow 506 in the first leading edge cooling passage 414 splits into a further two portions. The first further portion of the second portion of the first cooling flow 506 enters the inner platform pressure side cooling passage 606 to cool the inner platform 202 and then exits the turbine component 200 through the plurality of inner platform pressure side exit holes 610. The second further portion of the second portion of the first cooling flow 506 enters the inner platform leading edge cooling passage 1002 to cool the inner platform 202 and then exits the turbine component 200 through the plurality of inner platform leading edge exit holes 1004.

The front rib 402 is a solid rib without the front rib openings 502. The entire second cooling flow 510 flows through the second cooling path 704. In other constructions, the front rib 402 may have a plurality of front rib openings 502 and a portion of the second cooling flow 510 enters the first leading edge cooling passage 414 through the plurality of front rib openings 502 and joins the first cooling flow 506 in the first cooling path 702, as illustrated in FIG. 5 and FIG. 7.

The cooling scheme 1100 otherwise has the similar configuration as the cooling scheme 700.

Figure 14:
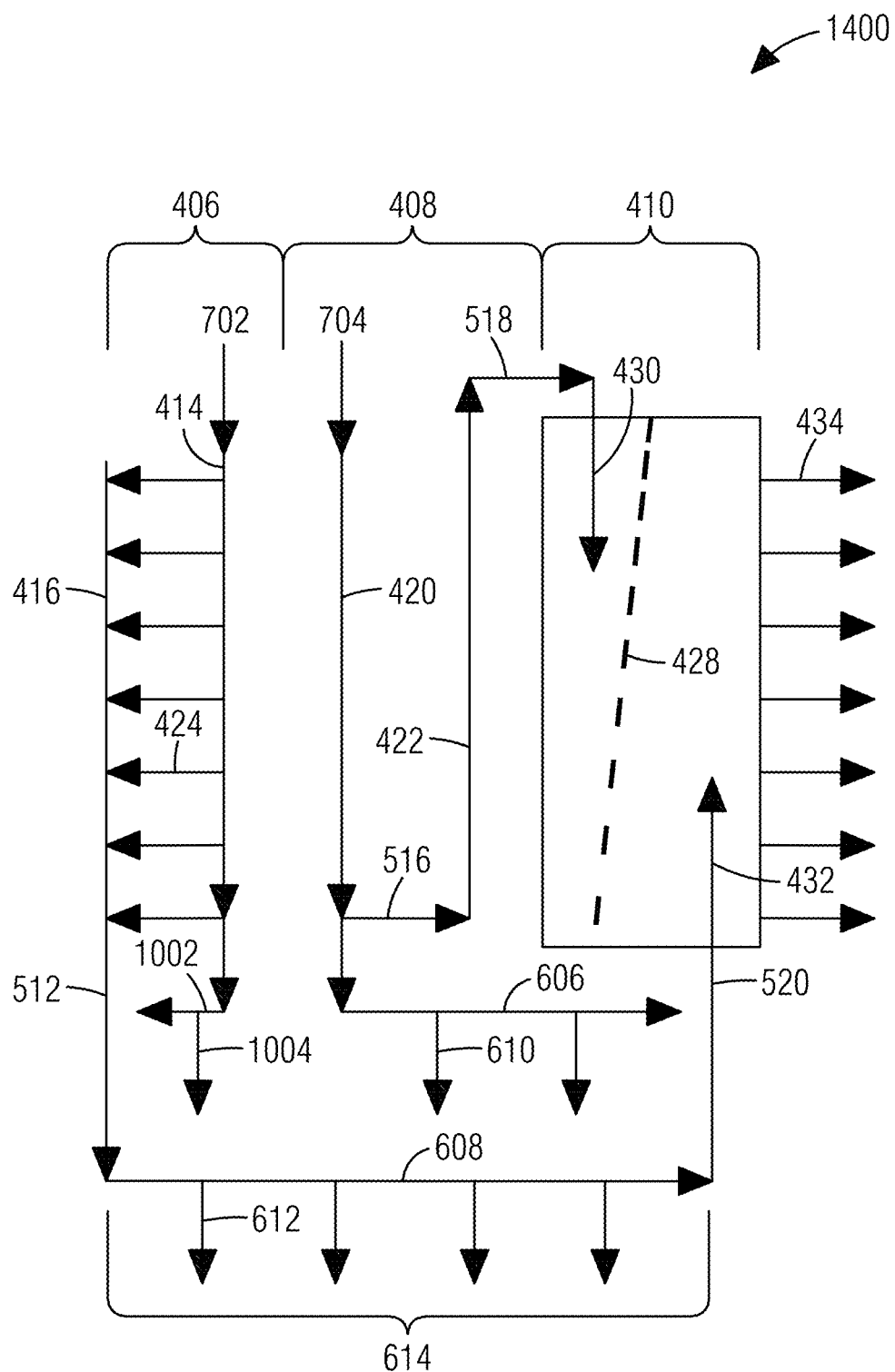
FIG. 14 is a schematic diagram of a cooling scheme.
Figure 15:
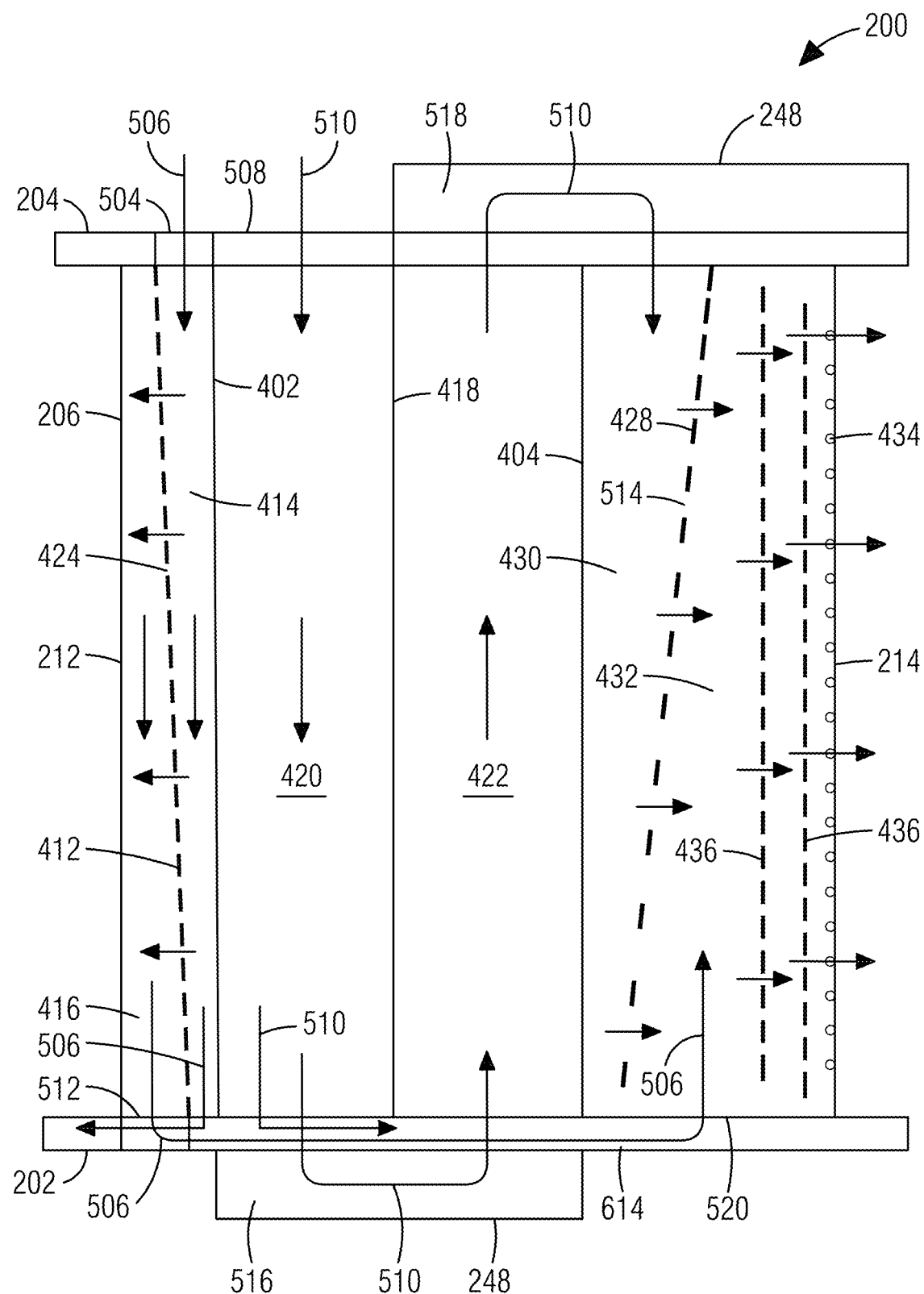
FIG. 15 is a schematic section view of the turbine component of FIG. 2 having the cooling scheme of FIG. 14.
Figure 16:
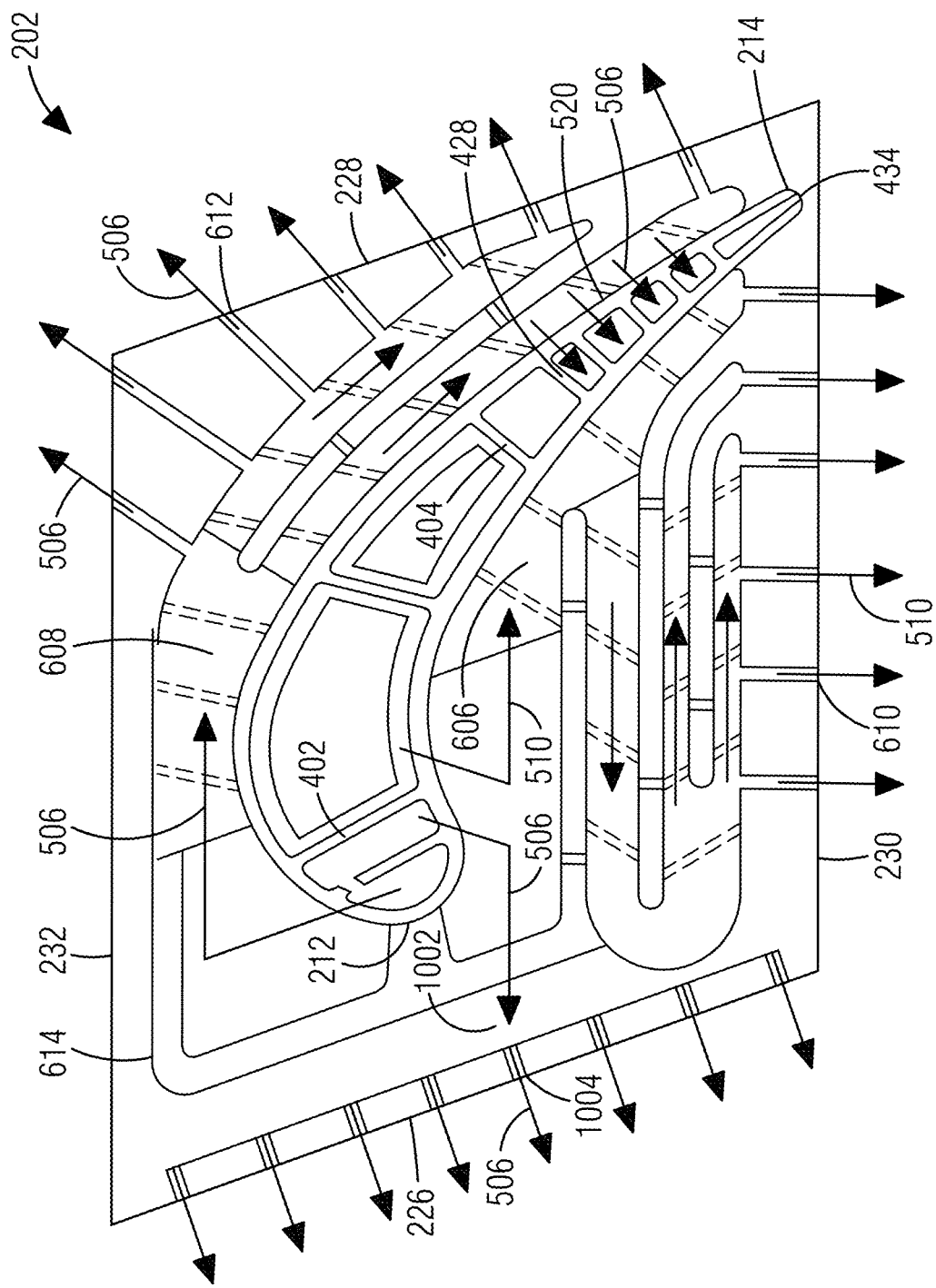
FIG. 16 is a section view of the inner platform of the turbine component of FIG. 2 having the cooling scheme of FIG. 14.

FIG. 14 is a schematic diagram of a cooling scheme 1400. FIG. 15 is a schematic section view of the turbine component 200 having the cooling scheme 1400. FIG. 16 is a section view of the inner platform 202 having the cooling schemes 1400.

In the cooling scheme 1400, the first cooling flow 506 in the first cooling path 702 splits into a first portion and a second portion. The first portion of the first cooling flow 506 flows from the first leading edge cooling passage 414 into the second leading edge cooling passage 416 and then enters the inner platform suction side cooling passage 608. The first portion of the first cooling flow 506 then flows into the second trailing edge cooling passage 432 while a portion of the first portion of the first cooling flow 506 exits the turbine component 200 through the plurality of inner platform suction side exit holes 612. The second portion of the first cooling flow 506 flows from the first leading edge cooling passage 414 into the inner platform leading edge cooling passage 1002 to cool the inner platform 202 and then exits the turbine component 200 through the plurality of inner platform leading edge exit hole 1004.

The second cooling flow 510 in the second cooling path 704 splits into a first portion and a second portion. The first portion of the second cooling flow 510 flows through the serpentine cooling path formed by the first middle cooling passage 420, the first connecting flow passage 516, the second middle cooling passage 422, the second connecting flow passage 518, and the first trailing edge cooling passage 430. The second portion of the second cooling flow 510 flows from the first middle cooling passage 420 into the inner platform pressure side cooling passage 606 to cool the inner platform 202 and then exits the turbine component 200 through the plurality of inner platform pressure side exit holes 610.

The front rib 402 is a solid rib without the front rib openings 502. The entire second cooling flow 510 flows through the second cooling path 704. In other constructions, the front rib 402 may have a plurality of front rib openings 502 and a portion of the second cooling flow 510 enters the first leading edge cooling passage 414 through the plurality of front rib openings 502 and joins the first cooling flow 506 in the first cooling path 702, as illustrated in FIG. 5 and FIG. 7.

The cooling scheme 1400 otherwise has the similar configuration as the cooling scheme 700.

Figure 17:
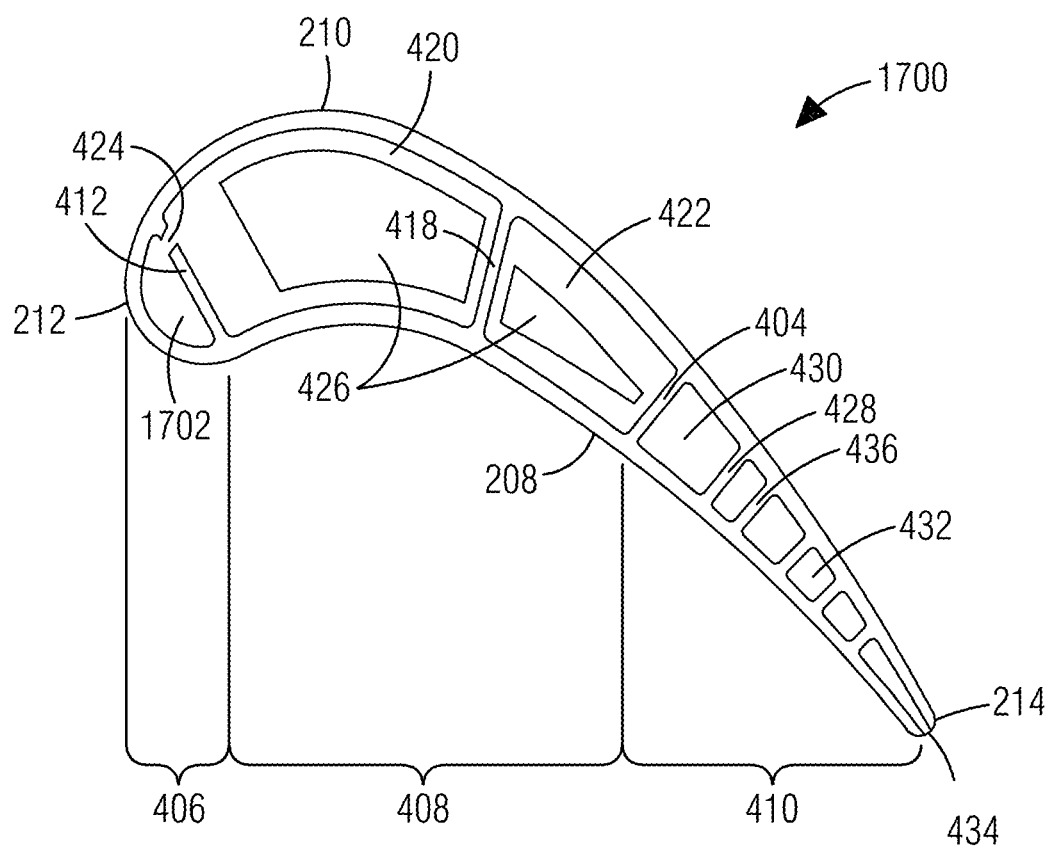
FIG. 17 is a section view of an airfoil of the turbine component of FIG. 2.

FIG. 17 is a section view of an airfoil 1700 of the turbine component 200. In the embodiment illustrated in FIG. 17, the front rib 402 is removed in the airfoil 1700. The leading edge region 406 is defined between the leading edge 212 and the leading edge rib 412 which defines a leading edge cooling passage 1702. The leading edge cooling passage 1702 is a diverging flow passage for the first cooling flow 506. The middle region 408 is defined between the leading edge rib 412 and the rear rib 404. The first middle cooling passage 420 is defined between the leading edge rib 412 and the middle rib 418. The trailing edge region 410 is defined between the rear rib 404 and the trailing edge 214.

The airfoil 1700 otherwise has the similar configuration as the airfoil 206.

Figure 18:
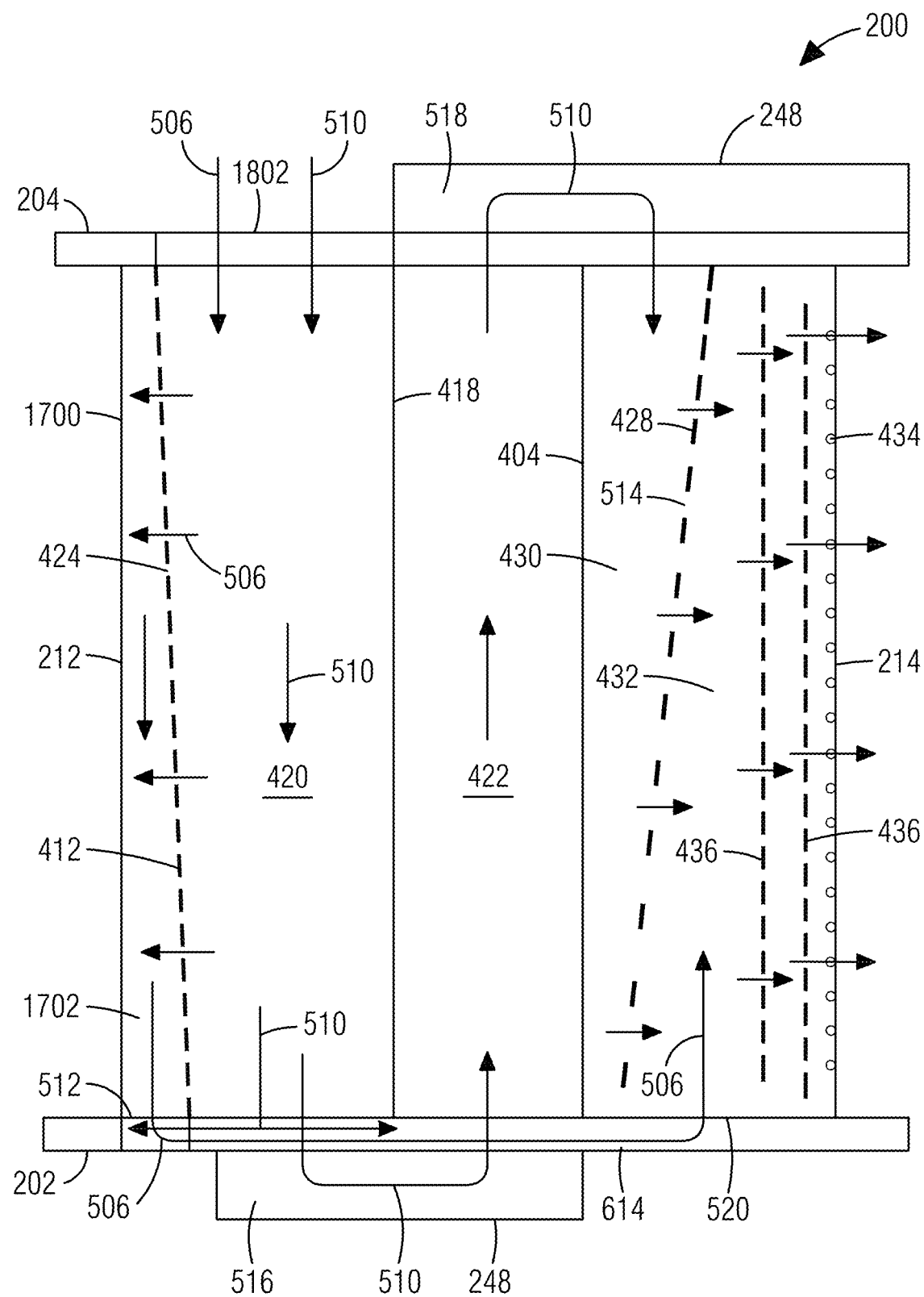
FIG. 18 is a schematic section view of the turbine component having the airfoil of FIG. 17.
Figure 19:
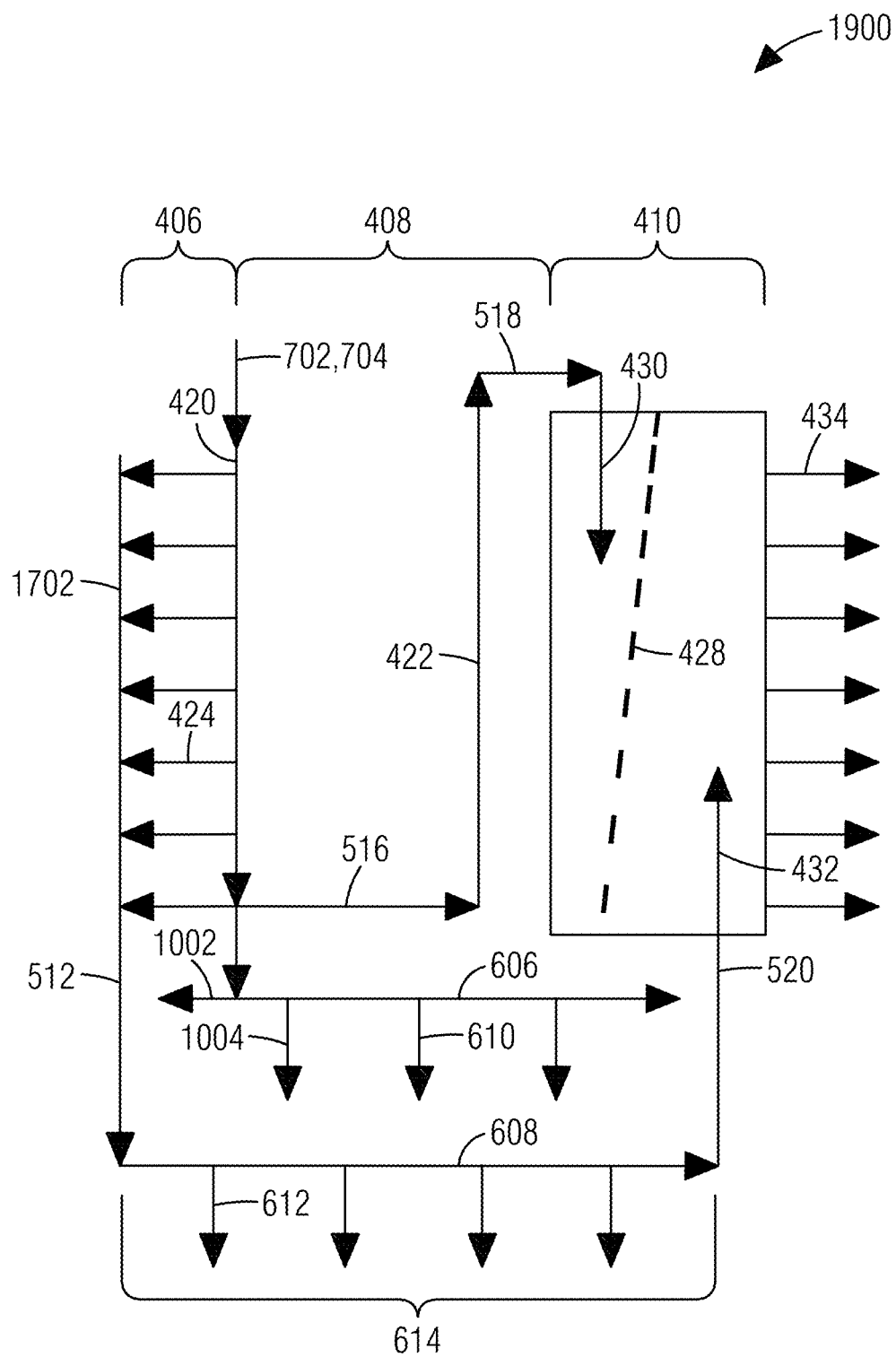
FIG. 19 is a schematic diagram of a cooling scheme of the turbine component of FIG. 17.
Figure 20:
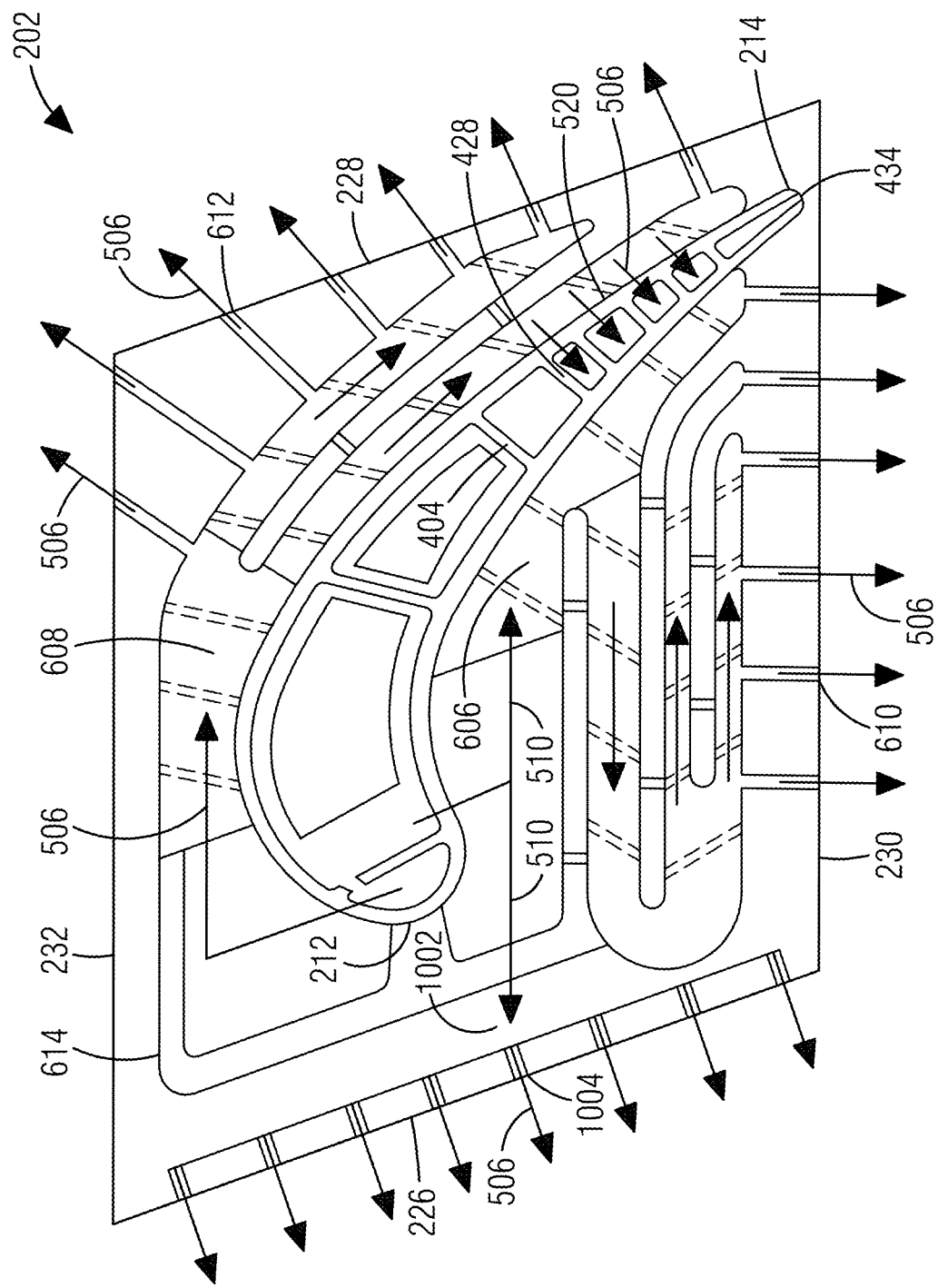
FIG. 20 is a section view of an inner platform of the turbine component of FIG. 17.

FIG. 18 is a schematic section view of the turbine component 200 having the airfoil 1700. FIG. 19 is a schematic cooling scheme 1900 of the turbine component 200 of FIG. 17. FIG. 20 is a section view of the inner platform 202 of the turbine component 200 of FIG. 17.

In the cooling scheme 1900, the first inlet 504 and the second inlet 508 are combined into one flow inlet 1802 that is formed in one of the inner platform 202 and the outer platform 204. In the embodiment illustrated in FIG. 18, the flow inlet 1802 is formed in the outer platform 204. In other embodiments, the flow inlet 1802 may be formed in the inner platform 202. The first cooling flow 506 is fed into the first cooling path 702 through the flow inlet 1802 and enters the leading edge cooling passage 1702 through the plurality of leading edge rib openings 424 while passing the first middle cooling passage 420. The entire first cooling flow 506 then enters the inner platform suction side cooling passage 608 through the leading edge flow connection 512 and then enters the second trailing edge cooling passage 432 through the trailing edge flow connection 520.

The second cooling flow 510 is fed into the second cooling path 704 through the flow inlet 1802 and enters the first middle cooling passage 420 and then splits into a first portion and a second portion. The first portion of the second cooling flow 510 flows through the serpentine cooling path formed by the first middle cooling passage 420, the first connecting flow passage 516, the second middle cooling passage 422, the second connecting flow passage 518, and the first trailing edge cooling passage 430. A portion of the second portion of the second cooling flow 510 enters the inner platform pressure side cooling passage 606 from the first middle cooling passage 420 to cool the inner platform 202 and then exits the turbine component 200 through the plurality of inner platform pressure side exit holes 610. The remaining portion of the second portion of the second cooling flow 510 enters the inner platform leading edge cooling passage 1002 to cool the inner platform 202 and then exits the turbine component 200 through the plurality of inner platform leading edge exit holes 1004.

The cooling scheme 1900 otherwise has the similar configuration as the cooling scheme 700.

During operation, the first cooling flow 506 is fed into the first cooling path 702 through the first inlet 504 and enters the first leading edge cooling passage 414 and then enters the second leading edge cooling passage 416 through the plurality of leading edge rib openings 424. The first cooling flow 506 may also be fed into the first cooling path 702 through the flow inlet 1802 and enters the leading edge cooling passage 1702 through the plurality of leading edge rib opening 424. The leading edge rib openings 424 creates the first cooling flow 506 in the second leading edge cooling passage 416 or in the leading edge cooling passage 1702 a cyclone. Cyclone refers to a turbulent swirl flow that may have a spiral, helix, or suitable flow path. The cyclonic first cooling flow 506 cools the leading edge 212 in a cyclonic way. The distribution and size of the leading edge rib openings 424 may be equal or varied in the flow direction of the cyclonic first cooling flow 506 to maximize the flow turbulence and heat transfer along the flow direction while maintaining a sufficient static pressure on the back side of the leading edge 212. The converging first leading edge cooling passage 414 and the diverging second leading edge cooling passage 416 or the diverging leading edge cooling passage 1702 ensure an even flow distribution of the first cooling flow 506 when entering the second leading edge cooling passage 416 or the leading edge cooling passage 1702 along the flow direction. The entire first cooling flow 506 exits the leading edge region 406 through the leading edge flow connection 512 into the inner platform cooling passage 614 to cool the inner platform 202. At least a portion of the first cooling flow 506 then flows back to the airfoil 206 through the trailing edge flow connection 520 to cool the airfoil 206.

The second cooling flow 510 is fed into the second cooling path 704 through the second inlet 508 or through the flow inlet 1802. The second cooling flow 510 flows through the serpentine cooling path including the first middle cooling passage 420, the first connecting flow passage 516, the second middle cooling passage 422, the second connecting flow passage 518, and the first trailing edge cooling passage 430. At least one of the first connecting flow passage 516 and the second connecting flow passage 518 is formed out of the airfoil 206 in one of the inner platform 202 and the outer platform 204. The displacement bodies 426 make the first middle cooling passage 420 and the second middle cooling passage 422 near wall cooling passages. The converging first trailing edge cooling passage 430 for the second cooling flow 510 and the increased size of the trailing edge rib openings 514 in the flow direction ensure an even flow distribution of the second cooling flow 510 when entering the second trailing edge cooling passage 432 along the first trailing edge cooling passage 430. The first cooling flow 506 and the second cooling flow 510 flow around the plurality of pin fins 436 and exit the turbine component 200 through the plurality of trailing edge exit holes 434.

The cyclone cooling of the leading edge 212 efficiently cools the leading edge 212. Film cooling holes at the leading edge 212 may be eliminated. Aerodynamic losses caused by a disturbance of a boundary layer around the airfoil 206 due to blowing out of the film cooling flow may thus be eliminated. The entire first cooling flow 506 flows into the inner platform cooling passage 614 after cooling the leading edge region 406. A portion of the first cooling flow 506 flows back to the airfoil 206 after cooling the inner platform 202.

The second cooling flow 510 may flow out of the airfoil 206 into at least one of the inner platform 202 and the outer platform 204 and is deflected by the hood 248 and turns back into the airfoil 206. Such arrangement cools the entire height of the airfoil 206 from the inner platform 202 to the outer platform 204. The displacement bodies 426 positioned in the first middle cooling passage 420 and the second middle cooling passage 422 create near wall cooling passages in the middle region 408. The near wall cooling passages efficiently cool the turbine component 200. The plurality of pin fins 436 also improves the cooling efficiency. The cooling scheme 700 is an efficient and closed loop cooling scheme and reduces the consumption of the cooling flow. The efficiency of the gas turbine engine 100 is thus improved.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the descriptions in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A turbine component comprising:
   an inner platform having an inner platform cooling passage;
   an outer platform;
   an airfoil extending between the inner platform and the outer platform, the airfoil having a pressure side wall, a suction side wall, a leading edge, a trailing edge, a leading edge region, a trailing edge region, and a middle region defined between the leading edge region and the trailing edge region;
   a leading edge rib positioned in the leading edge region and between the pressure side wall and the suction side wall, a plurality of leading edge rib openings formed in the leading edge rib, each leading edge rib opening positioned nearer to one of the pressure side wall and the suction side wall than the other of the pressure side wall and the suction side wall;
   a rear rib positioned in the trailing edge region and between the pressure side wall and the suction side wall;
   a first cooling path extending from a flow inlet formed in one of the inner platform and the outer platform, through the leading edge region, through the inner platform cooling passage, and into the trailing edge region; and
   a second cooling path extending from the flow inlet, through the middle region, and into the trailing edge region.

2. The turbine component of claim 1,
   wherein a leading edge cooling passage is defined between the leading edge rib and the leading edge, and wherein the leading edge cooling passage is a diverging flow passage.

3. The turbine component of claim 1, further comprising:
   a front rib positioned in the leading edge region and between the pressure side wall and the suction side wall;
   a first leading edge cooling passage defined between the leading edge rib and the front rib; and
   a second leading edge cooling passage defined between the leading edge rib and the leading edge,
   wherein the first leading edge cooling passage is a converging flow passage, and
   wherein the second leading edge cooling passage is a diverging flow passage.

4. The turbine component of claim 1, further comprising:
   a trailing edge rib positioned in the trailing edge region and between the pressure side wall and the suction side wall;
   a first trailing edge cooling passage defined between the trailing edge rib and the rear rib;
   a second trailing edge cooling passage defined between the trailing edge rib and the trailing edge,
   wherein the first trailing edge cooling passage is a converging flow passage, and
   wherein the second trailing edge cooling passage is a converging flow passage.

5. The turbine component of claim 4, further comprising:
   a plurality of trailing edge rib openings formed in the trailing edge rib,
   wherein a size of each trailing edge rib opening increases in a flow direction of the first trailing edge cooling passage.

6. The turbine component of claim 4, further comprising:
   a trailing edge flow connection formed between the inner platform cooling passage and the trailing edge region.

7. The turbine component of claim 6,
   wherein the trailing edge flow connection is positioned between the trailing edge rib and the trailing edge.

8. The turbine component of claim 1, further comprising:
   a leading edge flow connection formed between the leading edge region and the inner platform cooling passage,
   wherein the leading edge flow connection is the only flow outlet of the leading edge region.

9. The turbine component of claim 1, further comprising:
   a hood coupled to one of the inner platform and the outer platform,
   wherein the hood is positioned to reverse a flow direction of a cooling flow in the second cooling path.

10. The turbine component of claim 1, further comprising:
    a displacement body positioned in the middle region.

11. A method for forming a turbine component, the method comprising:
    forming an airfoil having a pressure side wall, a suction side wall, a leading edge, and a trailing edge, a leading edge region, a trailing edge region, and a middle region defined between the leading edge region and the trailing edge region;
    positioning a leading edge rib in the leading edge region and between the pressure side wall and the suction side wall;
    forming a plurality of leading edge rib openings in the leading edge rib, each leading edge rib opening positioned nearer to one of the pressure side wall and the suction side wall than the other of the pressure side wall and the suction side wall;
    positioning a rear rib in the trailing edge region and between the pressure side wall and the suction side wall;
    forming a flow inlet in one of an inner platform and an outer platform;

creating a first cooling path extending from the flow inlet, through the leading edge region, through an inner platform cooling passage, and into the trailing edge region; and establishing a second cooling path extending from the flow inlet, through the middle region, and into the trailing edge region.

12. The method of claim 11, further comprising:

positioning a trailing edge rib in the trailing edge region and between the pressure side wall and the suction side wall;

forming a first trailing edge cooling passage defined between the trailing edge rib and the rear rib; and forming a second trailing edge cooling passage defined between the trailing edge rib and the trailing edge, wherein the second cooling path extends from the middle region into the first trailing edge cooling passage, wherein the first trailing edge cooling passage is a converging flow passage, and wherein the second trailing edge cooling passage is converging flow passage.

13. The method of claim 12, further comprising:

forming a plurality of trailing edge rib openings in the trailing edge rib, wherein the second cooling path extends from the first trailing edge cooling passage into the second trailing edge cooling passage through the plurality of trailing edge rib openings, wherein a size of each trailing edge rib opening increases in a flow direction of the first trailing edge cooling passage.

14. The method of claim 12, further comprising:

positioning a front rib in the leading edge region and between the pressure side wall and the suction side wall;

forming a first leading edge cooling passage defined between the leading edge rib and the front rib; and forming a second leading edge cooling passage defined between the leading edge and the leading edge rib, wherein the first cooling path extends from the flow inlet into the first leading edge cooling passage and into the second leading edge cooling passage through the plurality of leading edge rib openings, wherein the first leading edge cooling passage is a converging flow passage, and wherein the second leading edge cooling passage is a diverging flow passage.

15. The method of claim 14, wherein the first cooling path extends from the second leading edge cooling passage into an inner platform pressure side cooling passage and into the the second trailing edge cooling passage and extends from the second leading edge cooling passage into an inner platform suction side cooling passage.

16. The method of claim 14, further comprising:

positioning a middle rib in the middle region and between the pressure side wall and the suction side wall; and forming a first middle cooling passage defined between the front rib and the middle rib, wherein the first cooling path extends from the second leading edge cooling passage into an inner platform suction side cooling passage and into the second trailing edge cooling passage, and wherein the second cooling path extends from the first middle cooling passage into an inner platform pressure side cooling passage and an inner platform leading edge cooling passage.

17. The method of claim 14, wherein the first cooling path extends from the first leading edge cooling passage into an inner platform pressure side cooling passage and an inner platform leading edge cooling passages and extends from the second leading edge cooling passage into an inner platform suction side cooling passage and into the the second trailing edge cooling passage.

18. The method of claim 14, further comprising:

positioning a middle rib in the middle region and between the pressure side wall and the suction side wall;

forming a first middle cooling passage defined between the front rib and the middle rib, wherein the first cooling path extends from the first leading edge cooling passage into an inner platform leading edge cooling passage and extends from the second leading edge cooling passage into an inner platform suction side cooling passage and into the second trailing edge cooling passage, and wherein the second cooling path extends from the first middle cooling passage into an inner platform pressure side cooling passage.

19. The method of claim 12, further comprising:

positioning a middle rib in the middle region and between the pressure side wall and the suction side wall;

forming a first middle cooling passage defined between the leading edge rib and the middle rib; and forming a leading edge cooling passage defined between the leading edge rib and the leading edge, wherein the first cooling path extends from the leading edge cooling passage into an inner platform suction side cooling passage and into the second trailing edge cooling passage, and wherein the second cooling path extends from the first middle cooling passage into an inner platform pressure side cooling passage and an inner platform leading edge cooling passage.

20. The method of claim 11, further comprising:

coupling a hood to one of the inner platform and the outer platform;

forming a connecting flow passage within the hood, wherein the second cooling path extends out of the airfoil into the one of the inner platform and the outer platform and extends back into the airfoil through the connecting flow passage forming a serpentine flow path.

* * * * *